(12) United States Patent
Giallorenzi et al.

(10) Patent No.: US 7,701,996 B1
(45) Date of Patent: Apr. 20, 2010

(54) METHODS AND APPARATUS IMPLEMENTING SHORT AND LONG CODE CHANNEL OVERLAY FOR FAST ACQUISTION OF LONG PN CODES IN SPREAD SPECTRUM COMMUNICATIONS SYSTEMS

(75) Inventors: Thomas R. Giallorenzi, Riverton, UT (US); Johnny M. Harris, Centerville, UT (US); Dan M. Griffen, Bountiful, UT (US); Richard B. Ertel, Midvale, UT (US); Eric K. Hall, Holliday, UT (US)

(73) Assignee: L-3 Communications Corporation, New York, NY (US)

( * ) Notice: Subject to any disclaimer, the term of this patent is extended or adjusted under 35 U.S.C. 154(b) by 1209 days.

(21) Appl. No.: 11/259,336

(22) Filed: Oct. 25, 2005

(51) Int. Cl.
*H04B 1/69* (2006.01)
(52) U.S. Cl. ........................ 375/130; 375/150; 375/149; 375/222; 375/142; 375/147; 370/349; 370/335; 370/342; 370/209; 370/320; 455/425; 455/560
(58) Field of Classification Search ................. 375/150, 375/142, 130, 147, 363, 145, 267; 370/349, 370/335, 209, 320, 491, 350; 455/560, 425
See application file for complete search history.

(56) References Cited

U.S. PATENT DOCUMENTS

| 5,111,478 | A  | * | 5/1992 | McDonald ................... 375/130 |
| 6,263,010 | B1 | * | 7/2001 | Naruse et al. ................ 375/130 |
| 6,727,790 | B2 | * | 4/2004 | Raphaeli et al. ............. 375/363 |
| 6,904,079 | B2 | * | 6/2005 | Hoffmann et al. ........... 375/145 |
| 2007/0162812 | A1 | * | 7/2007 | Herrmann .................... 714/749 |

* cited by examiner

*Primary Examiner*—Chieh M Fan
*Assistant Examiner*—Eva Y Puente
(74) *Attorney, Agent, or Firm*—Harrington & Smith

(57) ABSTRACT

The present invention concerns methods and apparatus for use in a spread spectrum communications system. In particular, in a method of the present invention information useful for acquiring a target signal is selected; the information is incorporated in an acquisition signal; the acquisition signal is transmitted; the target signal is spread with a spreading code; and the target signal is transmitted. At a receiving node, the acquisition information useful for acquiring the target signal is recovered from the acquisition signal and used to acquire the target signal. Apparatus in accordance with the present invention implement methods of the present invention. The methods and apparatus of the present invention can be used in node- and network-discovery situations.

38 Claims, 16 Drawing Sheets

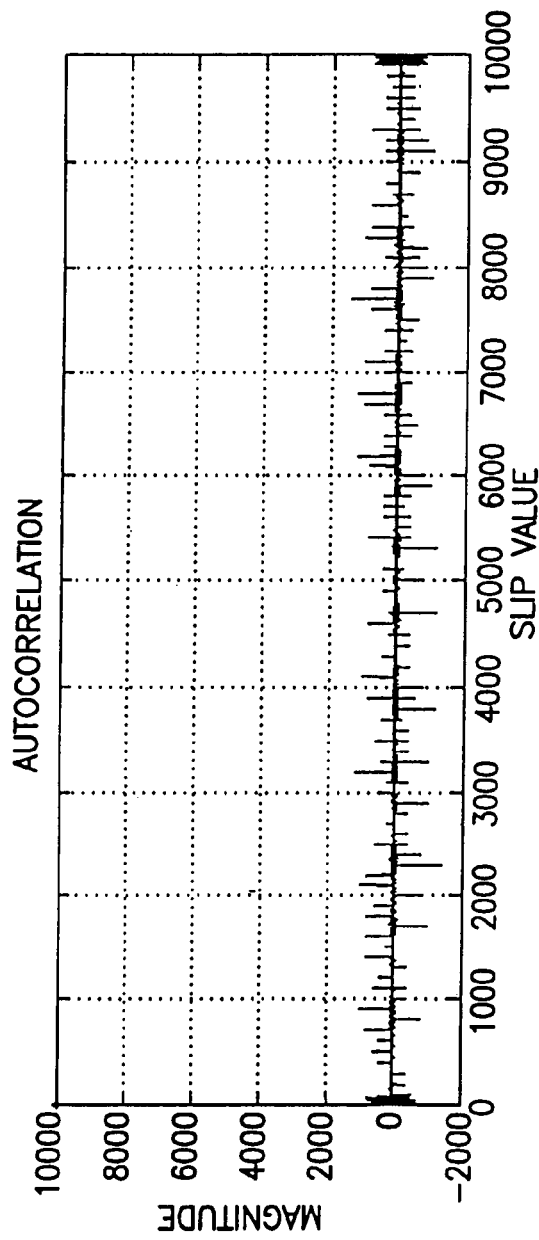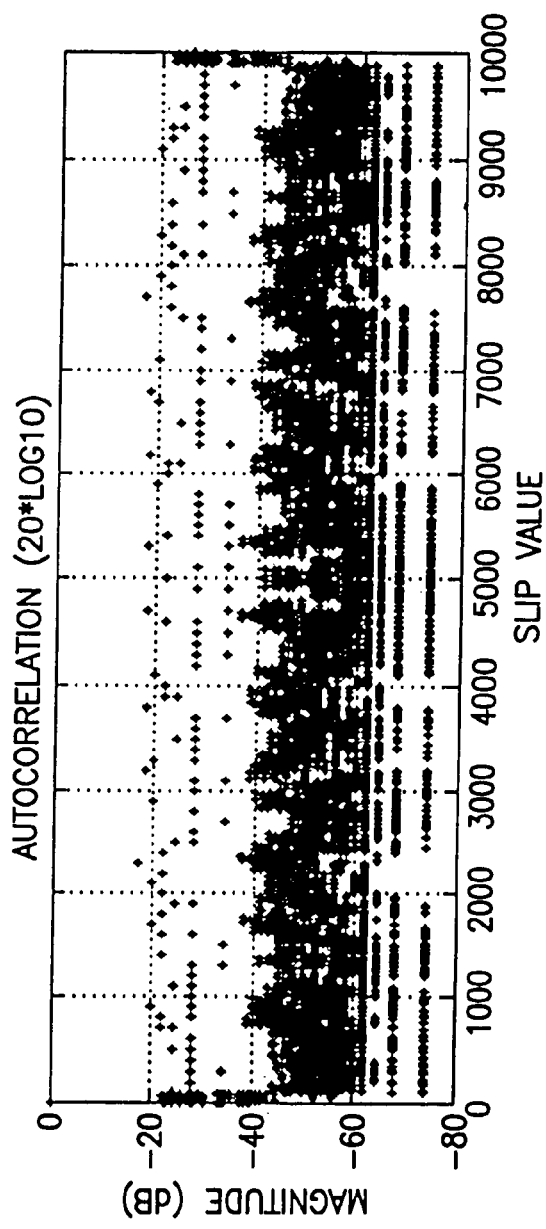
FIG.4A
FIG.4B

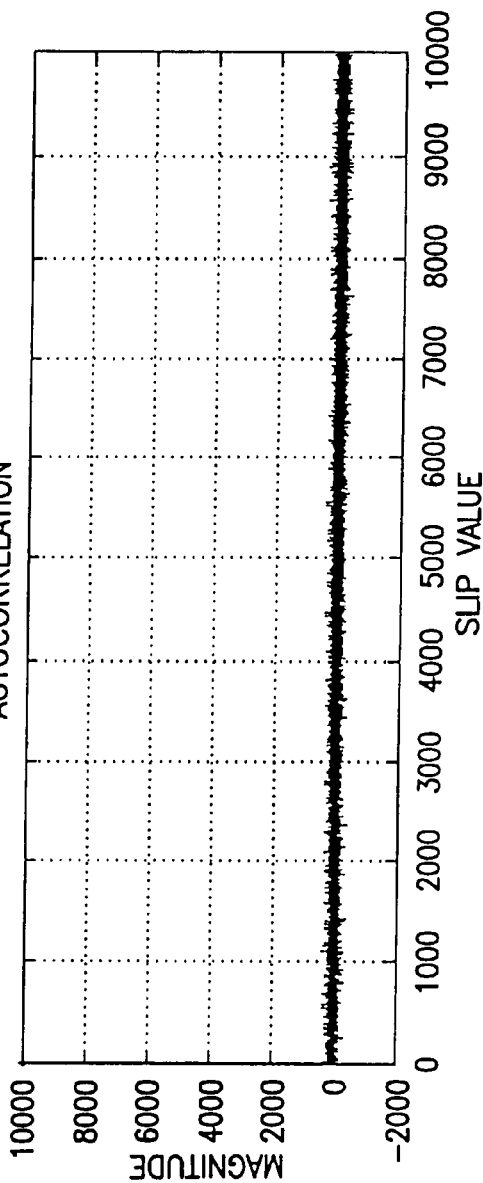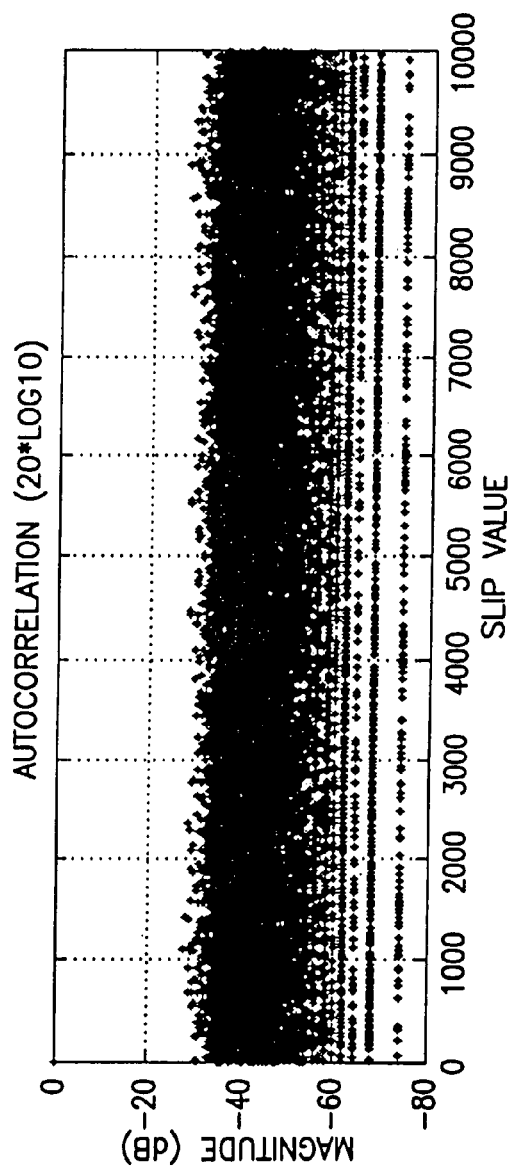
FIG. 6A PRIOR ART
FIG. 6B PRIOR ART

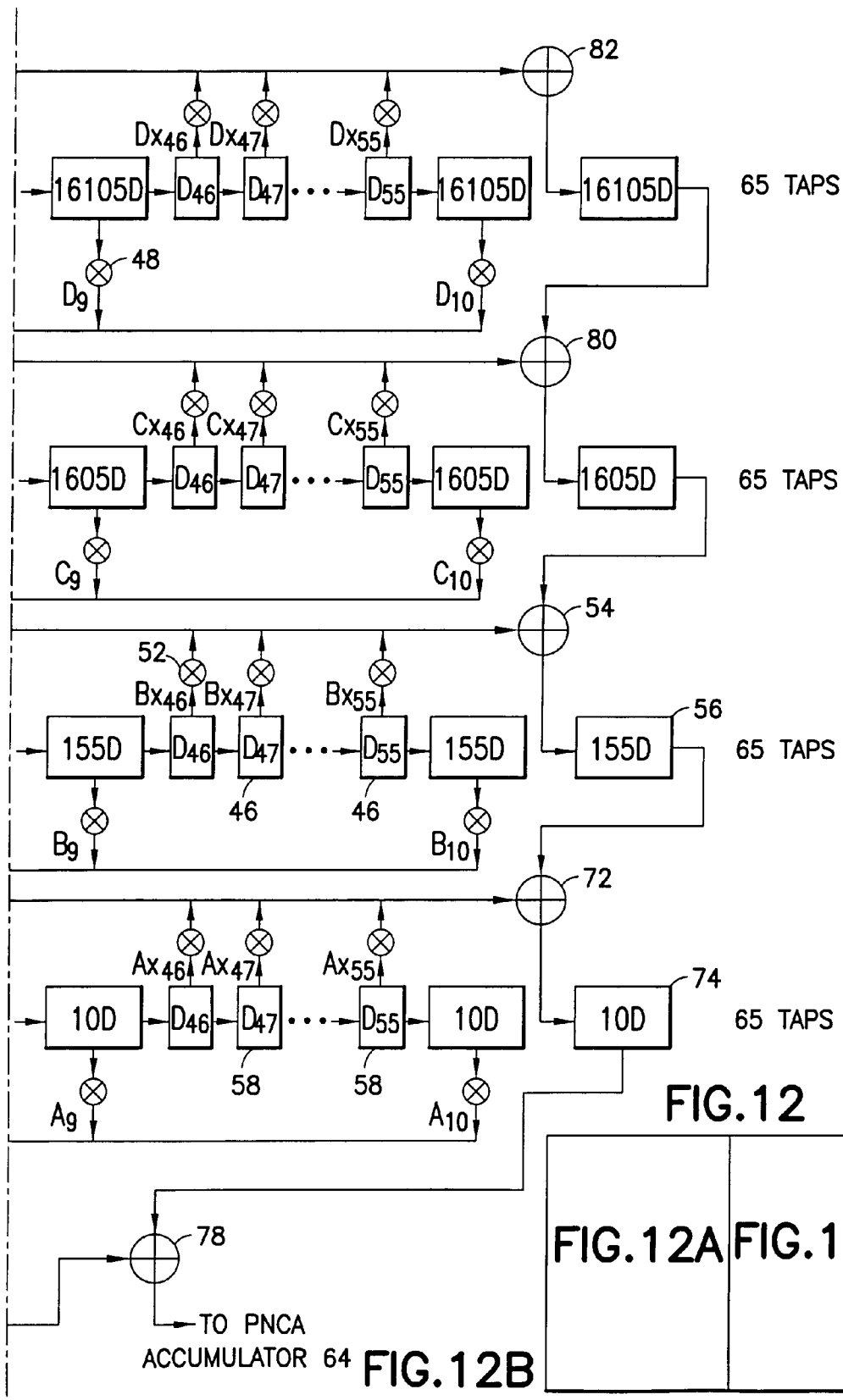

METHODS AND APPARATUS IMPLEMENTING SHORT AND LONG CODE CHANNEL OVERLAY FOR FAST ACQUISTION OF LONG PN CODES IN SPREAD SPECTRUM COMMUNICATIONS SYSTEMS

TECHNICAL FIELD

The present invention generally concerns methods and apparatus for creating communications signals for use in spread spectrum communications systems, and more particularly concerns methods and apparatus where an acquisition signal carries information for use in acquiring a target signal.

BACKGROUND

In direct sequence spread spectrum (DSS) communication, a wide band carrier signal is modulated by a narrow band message signal. The wide-band carrier is typically generated by modulating a single frequency carrier using a pseudo-random noise (P/N) code sequence. The data rate at which a message is communicated is usually much lower than the P/N code symbol or "chip" rate. The ability of DSS to suppress interference is proportional to a ratio of the chip rate and the data rate. In many applications, there are thousands of code chips per data bit.

At the receiver, a carrier replica is generated by reducing the DSS signal to baseband and multiplying it with a locally generated replica of the original narrow-band carrier using a local oscillator. If the frequency and phase of the carrier replica is the same as that of the received original narrow-band carrier, then the multiplier output signal will be the product of the bipolar P/N code and intended message. The P/N code is removed by multiplying the wide-band data stream with the locally generated replica of the P/N code that is time-aligned with the received P/N code. This is the despreading process.

Generating the carrier replica with proper carrier frequency and phase and generating the P/N code replica at the proper rate and time offset is a complex problem. In many DSS communication systems, the necessary carrier frequency, carrier phase, and P/N code offset are not known a priori at the receiver, which tries different values until a large signal is observed at the data-filter output. This is termed the search or acquisition process, and a DSS signal is said to be acquired when the proper frequency, phase and code offset have been determined. A receiver selects and detects a particular transmitted signal by choosing the appropriate P/N code and performing the acquisition search. In some cases the acquisition search must include examination of different P/N codes from a known list when the transmitting node is not known. When many different codes, code offsets and carrier frequencies must be examined and the SNR is low, the acquisition task can be both time and energy consuming.

The above constraints are more pronounced in a secure environment such as that depicted in FIG. 1 (detailed below), where a new node termed a hailing node 34 seeks to join an existing network while maintaining security for the joining node and those nodes already on the network. In addition, an established network requires a method of discovering the existence of another separate network that may have migrated into communication range, so that a cross-link can be established between the networks in order to form a larger network. The process of nodes "discovering" each other is termed node discovery, and is where DSS signal acquisition occurs. Typically, node discovery is done on channels separate from the primary data communication channels. Limited data exchange on the "discovery channel" is preferable for network optimization. As a result, the discovery waveform must be flexible in the messages it carries and not be constrained to one specific message type or size.

The air interface should consist of a flexible and symmetric full-duplex or half-duplex link. The transmitting node or hailing node is that node that sends a discovery signal, essentially a message inquiring as to the presence of receiving nodes. Receiving nodes are the nodes that listen for the discovery signal. The receiving nodes are therefore target nodes, which may have already formed a network. These receiving nodes may become transmitting nodes when they send an acknowledgment back to the initiating new node. In this way, a new node that flies into range of an established network will transmit discovery messages on that transmitting node's transmit link. When a receiving node in the established network hears the discovery message on the receive link, it will respond via its transmit link which is the hailing node's receiving link. Subsequent handshaking can then be performed via the two nodes' transmit and receive links to bring the initiating new node into the network. The transmitting and receiving links may occupy separate time slots in a time division duplex (TDD) system, or may be separate frequency bands in a frequency division (FDD) system.

An exemplary but non-limiting environment in which node discovery may be important is illustrated in perspective view at FIG. 1, a prior art arrangement of disparate nodes operating in a traffic data network and one hailing node seeking to join the traffic network. The nodes may be airborne as in aircraft; terrestrial as in autos, trucks and trains; or waterborne as in ships and other surface watercraft. They may be stationary or mobile, fast or slow moving, as for example, communications between nodes in a building, an aircraft, and an automobile. For additional flexibility, it is assumed that a hailing node 34 may not have a clock signal synchronized with the network prior to joining. The range 22 of the traffic data network is centered on a command node 24, absent relays by other nodes within the network. Where the network links members via a satellite link, the line-of-sight range 22 is not particularly relevant. The range 22 is included to show further advantages of the invention that may be exploited when network communications are geographically limited.

The command node is representative of the node that receives the discovery signal, and may be a true command node that controls access to the secure network (in that no other nodes receive and acknowledge discovery signals) or it may represent any node already established within the network that receives the discovery signal (such as where all established nodes listen for discovery signals). In FIG. 1, all nodes depicted as within the traffic network range 22 communicate on the traffic network, either through the command node 24 or directly with one another once granted network entry. The traffic network typically operates by directional antennas 24a, at least at the command node 24, to maximize the network range 22. This is because directional antennas typically enable a higher antenna gain and a higher tolerable path loss as compared to omni-directional antennas. Therefore, a range (not shown) of a discovery network that operates using omni-directional antennas 24b is somewhat less, at least in the prior art. The command node 24 maintains communication with stationary nodes 26, 28. When two nodes are aircraft, they may be closing or separating from one another at very high rates, rendering Doppler effects significant. When a hailing node 34 sends a discovery signal to locate and request entry into the traffic network, its signal is typically not received at the command node 24 until the hailing node is within the traffic network range 22. Since the hailing node 34 is not yet identified as authorized, this potentially puts communication within the network at risk, or alternatively unduly delays granting the hailing node 34 access to the network. Because access to the traffic network is obtained through the discovery protocol, that protocol must exhibit security features to prevent compromise of the traffic network.

Considering the issues apparent in light of FIG. 1, a good node discovery scheme for a highly secure communications network would therefore exhibit (a) high speed and reliability; (b) long range; (c) low probability of intercept (LPI) and low probability of detection (LPD) by unauthorized parties; (d) universal discovery and recognition among the various nodes; (e) asynchronous discovery; and (f) reliability for both stationary and fast-moving nodes. Each of these aspects are detailed further at co-owned and co-pending U.S. patent application Ser. No. 10/915,777, herein incorporated by reference in its entirety as if fully restated herein.

Transmission signals are normally divided into preamble and payload sections, payload carrying the substantive data. In a discovery signal of the prior art, the preamble and payload sections were at the same frequency and the receiving node would search among the possible frequency bins until it acquired the signal preamble. This prior art approach has been described as the receiver spinning its frequency search. In Doppler environments where transmitter and receiver may move relative to one another at a rate unknown prior to acquisition, as with the hailing and command nodes of FIG. 1, the frequency at which a discovery signal reaches a receiver is unknown to the extent of Doppler uncertainty. Ensuring the prior art receiver locks onto a discovery signal payload within the very short time of that signal preamble (e.g., on the order of milliseconds) with a high degree of probability requires a large hardware commitment. The present invention uses a different discovery signal regimen to reduce the hardware requirement in the receiver while simultaneously decreasing acquisition time in a highly secure communication environment.

Accordingly, in such communications environments the goals of security, hardware simplicity and speed of operation are often conflicting. For example, security requires very long and often complex spreading codes. Such codes require complicated circuitry on the transmitting and receiving sides which, in addition, require relatively large amounts of power to operate. Further, communications signals spread with such codes may take relatively long to acquire.

As a result, in most if not all situations encountered in such communications environments, fast acquisition of communications channels is desired. Fast acquisition contributes favorably to desired goals of low probability of intercept and resistance to jamming. Fast acquisition, though, may require relatively short and simple spreading codes, negatively impacting security. Those skilled in the art do not desire that speed of acquisition sacrifice security, pointing back to the use of long spreading codes.

For these reasons, those skilled in the art desire methods and apparatus for use in channel acquisition that have security performance usually associated with long spreading codes, while having speed of acquisition usually associated with short codes. Those skilled in the art also desire methods and apparatus for use in channel acquisition that are applicable to frequency hopping spread spectrum communications systems and hybrid time-division or frequency-division spread spectrum communications systems.

SUMMARY OF THE PREFERRED EMBODIMENTS

The foregoing and other problems are overcome, and other advantages are realized, in accordance with the presently preferred embodiments of these teachings.

A first alternate embodiment of the present invention comprises a communications method for use in a spread spectrum communications system comprised of at least first and second spread spectrum communications channels, the communications method comprising: at a transmitting node: selecting acquisition information for use in acquiring a target signal to be transmitted in the second spread spectrum communications channel; creating an acquisition signal for use in acquiring the target signal to be transmitted in the second spread spectrum communications channel, where the acquisition signal comprises, at least in part, the acquisition information for use in acquiring the target signal; and transmitting the acquisition signal in the first spread spectrum communications channel.

In another aspect of the first alternate embodiment, the transmitting node spreads the target signal with a spreading code, where the acquisition information carried in the acquisition signal can be used to acquire the target signal, and then transmits the target signal. In variants of the first alternate embodiment the information carried in the acquisition signal concerns the phase of the spreading code used to spread the target signal.

In additional aspects of the first alternate embodiment, the acquisition signal comprises a preamble portion and a payload portion, where the preamble portion is spread with a first spreading code and the payload portion is spread with a second spreading code. In variants of the first alternate embodiment, the first spreading code is a composite code constructed from at least two constituent codes. The composite code in still other embodiments may, be doped with components from at least a third constituent code to improve the autocorrelation properties of the third composite code. In other variants of the first alternate embodiment, the first spreading code used to spread the preamble portion is relatively short when compared to the second spreading code used to spread the payload portion.

In further aspects of the first alternate embodiment, the preamble portion of the acquisition signal contains a pattern indicative of the phase of the first spreading code used to spread the preamble portion of the acquisition signal. In variants of the first alternate embodiment the preamble portion of the first spreading code may further comprise a synchronization pattern for indicating where the preamble portion ends and the payload portion begins.

In still other aspects of the first alternate embodiment, the transmitting node comprises a hailing node and the acquisition signal comprises a discovery signal. In variants of the first alternate embodiment, the target signal carries information concerning: the identity of the hailing node; the location of the hailing node; the velocity of the hailing node; and the direction of travel of the hailing node.

A second alternate embodiment comprises a communications method for use in a spread spectrum communications system comprised of at least first and second spread spectrum communications channels, the communications method comprising: at a receiving node: receiving an acquisition signal transmitted in the first spread spectrum communications channel, where the acquisition signal carries acquisition information for acquiring a target signal to be transmitted at some point in time after the acquisition signal in the second spread spectrum communications channel; recovering the acquisition information for acquiring the target signal from the acquisition signal; and using the information to acquire the target signal.

In a variant of the second alternate embodiment, the acquisition signal comprises a preamble portion and a payload portion; the preamble portion is spread with a first spreading code and the payload portion is spread with a second spreading code; and the preamble portion carries a pattern indicating the phase of the first spreading code. When recovering acquisition information for acquiring the target signal, the receiving node performs the initial step of de-spreading the preamble portion of the acquisition signal using the first spreading code and phase information reflected in the pattern.

In another variant of the second alternate embodiment, the preamble portion of the acquisition signal carries a synchronization pattern indicating where the preamble portion ends and the payload portion begins. When recovering acquisition information for acquiring the target signal, the receiving node detects the beginning of the payload portion using the synchronization pattern; and de-spreads the payload portion of the acquisition signal using the second spreading code.

A third alternate embodiment of the present invention comprises a communications method for use in a spread spectrum communications system comprising at least a first and second spread spectrum communications channel, the method comprising: at a transmitting node: selecting acquisition information for use in acquiring a target signal to be transmitted at some point in time after an acquisition signal, where the target signal will be transmitted in the second spread spectrum communications channel; including the acquisition information in the acquisition signal when creating the acquisition signal; transmitting the acquisition signal; spreading the target signal with a spreading code, where the acquisition information carried in the acquisition signal can be used to acquire the target signal; and transmitting the target signal; at a receiving node: receiving the acquisition signal; recovering the acquisition information for acquiring the target signal from the acquisition signal; and using the acquisition information recovered from acquisition signal to acquire the target signal.

A fourth alternate embodiment of the present invention comprises a node operable in a spread spectrum communications system for transmitting spread spectrum communication signals, the node comprising: at least one antenna; and a transmitter coupled to the at least one antenna, where the transmitter transmits an acquisition signal in a first spread spectrum communications channel and where the acquisition signal comprises at least in part acquisition information for use in acquiring a target signal to be transmitted in a second spread spectrum communications channel.

A fifth alternate embodiment of the present invention comprises a node operable in a spread spectrum communications system for receiving spread spectrum communications signals, the node comprising: at least one antenna; and a receiver coupled to the at least one antenna, where the receiver is operable to receive at least an acquisition signal transmitted in a first spread spectrum communications channel and a target signal transmitted in a second spread spectrum communications channel, where the receiver recovers from the acquisition signal acquisition information useful for acquiring the target signal.

Thus it is seen that embodiments of the present invention overcome limitations of the prior art. In prior secure communications environments, long spreading codes have been used to improve security. The length and complexity of such codes, required for secure operations, have resulted in complex and energy-inefficient transmitting and receiving circuitry, with relatively slow acquisition speed.

In contrast, the present invention uses an acquisition signal spread with a relatively short spreading code that contains information useful for acquiring a target signal spread with a relatively long spreading code that is transmitted at some point in the future after the acquisition signal. The information contained in the acquisition signal makes it easier for the receiver to quickly acquire the target signal spread with relatively long spreading code.

In the methods and apparatus of the present invention, this improvement in acquisition time does not come at the cost of security as in prior art communications systems. In the present invention, self-jamming methods preserve the security of the first communications signal spread with the relatively short code.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIGS. 4A-4B are respectively linear and logarithmic graphs of autocorrelation of a basic composite code of length 10,000 made from two constituent codes each of length 100, as described herein;

FIGS. 6A-6B are similar respectively to FIGS. 6A-6B, but for a random P/N code of length 10,000;

DETAILED DESCRIPTION OF THE PREFERRED EMBODIMENTS

Figure 1:
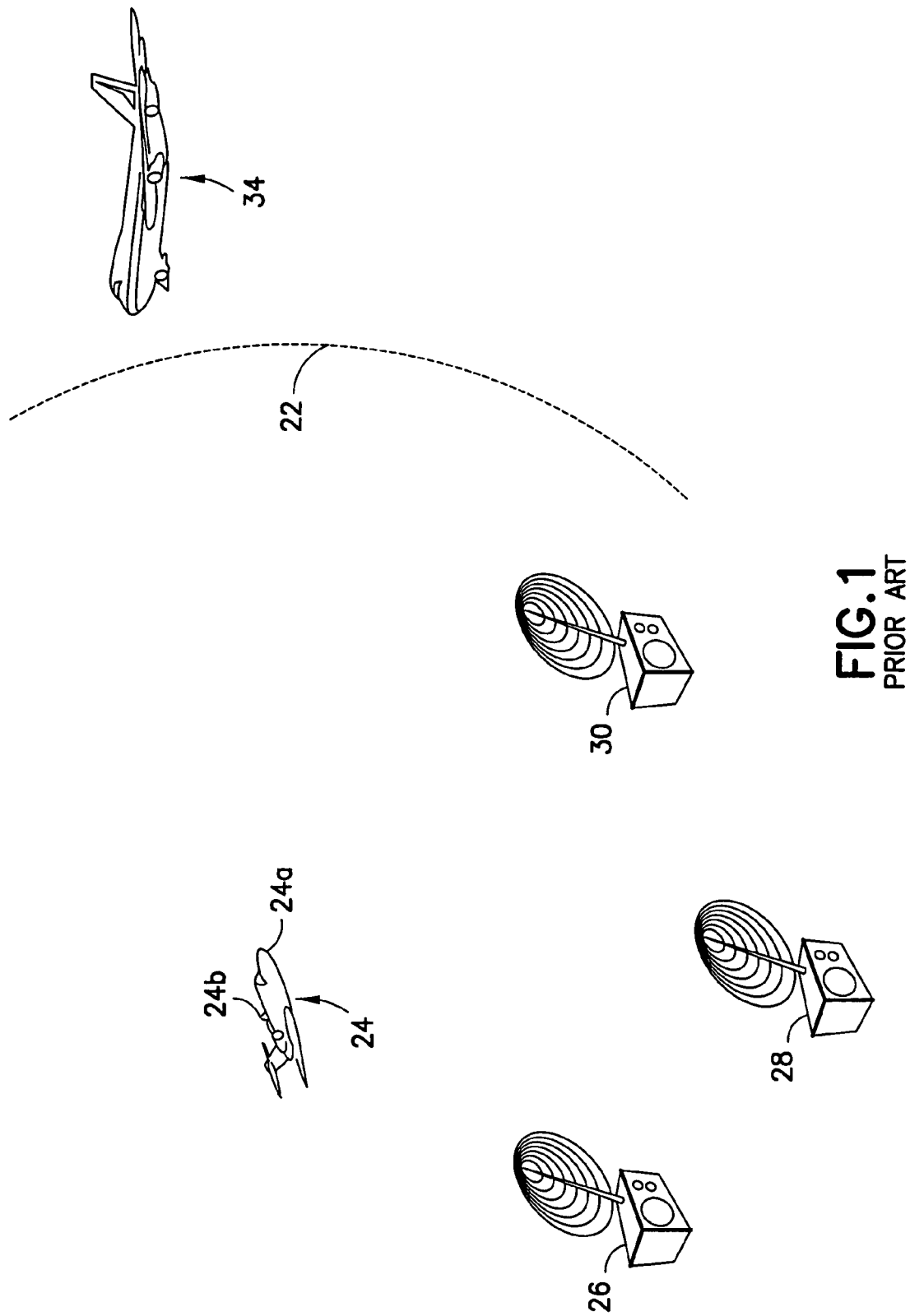
FIG. 1 is a schematic diagram of a particularly challenging prior art communication system in which a hailing node seeks entry into a communication network, and is an apt environment for the present invention.

The highest-level requirement for a discovery link is that it provides a method for mobile or fixed covert communication platforms, which will be called nodes, to recognize each other's existence, and possibly each other's locations, to be able to join together and form a network. Once a network is established, new nodes often need to join the existing network, and they need a way to do this without compromising themselves, or the network that they are joining. In addition, an established network requires a method of discovering the existence of another disjoint network that has migrated into communication range, so that a cross-link can be established between the networks in order to form a larger network.

A discovery link's primary function is to provide nodes with a "discovery channel" that facilitates the connection of traffic channels that will carry most of the high-rate data between the nodes. A secondary function of the discovery link is to enable the network to potentially exchange information between nodes to manage and optimize the network. It is also possible, however, that the discovery network could be used to carry small amounts of traffic data between nodes. As a result, the discovery waveform must be flexible in the messages it carries and not be constrained to one specific message type or size.

As used herein, the transmitting node is the node that sends a discovery signal and the receiving node is the node that listens for that incoming signal. The receiving nodes are thus defined as the target nodes, which may already have formed a network. These receiving nodes will then become transmitting nodes when they send an acknowledgement back to the initiating new node. In this way, a new node that flies into range of an established network will transmit discovery messages on that transmitting node's transmit link. This new-entrant node will also be referred to as the hailing node. When a receiving node in the established network hears the discovery message on its receive link, it will respond via its transmit link which is the hailing node's receiving link. Subsequent handshaking can then be performed via the two node's transmit and receive links to bring the initiating new node into the network. The transmitting and receiving links may occupy separate time slots in a time division duplex (TDD) system, or may be separate frequency bands in a frequency division duplex (FDD) system.

To achieve the goals stated above, a good node discovery scheme will possess the following features. It should be fast and reliable. It will permit nodes to recognize each other's existence before they are within high-rate communication range of each other. It will utilize highly covert, jam-resistant signals that are difficult to intercept. As a result, these discovery signals will avoid alerting the enemy to the existence or location of the transmitting nodes and the network. Furthermore, if the transmissions are recognized, they will be difficult to interpret or jam. It will provide a way for any node to discover any other node in the network. It will be capable of operating asynchronously, in the sense that discovery signals will be unscheduled, and it will not depend upon a common clock being available to all nodes. In contrast, if a common clock is available to all nodes, then the system should be capable of operating with a more sophisticated level of transmission security (TRANSEC). It will operate without degradation on fast-moving platforms, as well as stationary platforms.

The first desirable feature listed above ensures that discovery process will be fast and will occur with high probability. Network entry time is one of the key metrics used to evaluate various discovery schemes. Fast network entry is desirable because it permits nodes to enter and exit networks frequently and also by minimizing the time spent sending discovery signals, the node will be more covert.

Another desirable feature is that the air interface must be designed to be as covert and robust as possible. The covertness requirement implies that the waveform must have a low probability of intercept ("LPI") and a low probability of detection ("LPD"). The robustness requirement implies that the waveform must be as jam-proof as possible or anti jam (AJ). Embodiments of the present invention will work with a processing gain of 50 dB (either with direct sequence or frequency hopping spread spectrum methods). This can be scaled down for particular applications that do not have enough bandwidth allocated to discovery to permit a 50 dB processing gain.

A further requirement is that the waveform must support very fast acquisition. The term "very fast acquisition" means that the receiving node must be capable of reliably extracting data from the transmitting node within a small fraction of a second from when the transmission begins, so that the bursts can be kept as short and thus covert as possible. The initial signals must be at the lowest possible power level and spread over a band that is ideally greater than 50 dB wider than the signal bandwidth required. This fast acquisition must occur whether the transmitting node is stationary or is mobile at rates of up to several thousand km/hr in any direction. The waveform must support the fast acquisition of signals from nodes having no idea of their velocity relative to the transmitting node (so transmit precompensation must not be a prerequisite). In order to keep the cost, size weight and power of the discovery modem to a minimum, it must be assumed that each has a reference oscillator with an accuracy of no better than 1 part per million (ppm).

Aspects of the present invention overcome the limitations of the prior art listed above and provide methods and apparatus for improving acquisition time in a covert communication system. Other aspects of the present invention concerns methods and apparatus to protect a channel using a short code from interception by self-jamming the short-code channel with a long-code channel.

In the first aspect of the present invention, a code division multiplexed (CDM) signal is transmitted in a first spread spectrum communications channel. The CDM signal is an acquisition signal transmitted in the first spread spectrum communications channel, which functions as an acquisition channel. In one embodiment of the present invention, the acquisition signal is spread with a relatively short PN code that can be acquired quickly. The encrypted payload of the acquisition signal transmitted in the acquisition channel will contain acquisition information about another CDM target signal to be transmitted in another spread spectrum communications channel at some defined point in time. This acquisition information can then be used to acquire the other CDM target signal, which might use a hundred-year-long PN code. In one embodiment, the acquisition information concerns the seed (phase) of the other CDM target signal. In this embodiment, just the phase, and not the structure of the long code, is passed through the encrypted payload of the acquisition signal. In other embodiments, though, other information besides or in addition to the phase, may be passed.

Normally, it is envisioned that the short-code acquisition signal transmitted in the acquisition channel will have a very low rate and a very high processing gain, while the long-code target signal will have a lower processing gain and higher rate. For this reason, the power allocated to the acquisition signal transmitted in the acquisition channel will be very small relative to the long-code target signal transmitted in the target channel. If, for example, the short-code acquisition signal runs at 500 bps, while the long-code target signal runs at 5 Mbps, then the long code target channel will be allocated perhaps 40 dB more power than the short-code acquisition channel. Since 40 dB is the ratio of the channel data rates, both channels will operate with the same Eb/No after dispreading. As a result, the energy loss to the long-code target channel will be negligible (tenths or hundredths of a dB) as opposed to the traditional XYZ code scheme that loses 6 dB during acquisition.

The second aspect of the present invention is to use a long code channel at a much higher power level to make it more difficult to intercept the acquisition signal broadcast on the much weaker short-code acquisition channel. This technique is called self-jamming. The long-code target channel will run with much higher power than the weaker short-code acquisition channel and thus anyone trying to observe and eavesdrop on the acquisition signal broadcast in the weak channel will be forced to do so in the presence of very strong interference from the signal transmitted in the long-code target channel. In the example above, the long-code target channel might run with 40 dB more power than the short-code acquisition channel. The eavesdropper will be forced to try to hear a signal that is 10,000 times weaker than the noise. If the long-code target channel is being used strictly as a jammer, then it is unimportant what data it carries as long as it is fairly random.

In one possible embodiment of the present invention, a forward downlink can use this invention. In this embodiment, the forward downlink is a link from a satellite, which is linked to programmable field units (PFUs). This forward downlink is a point-to-multipoint link that has three side channels, and a series of traffic channels. Every side channel uses a different direct-sequence PN code so that the forward link can be characterized as a CDM link. The three side channels consist of a maintenance side channel that uses a hundred-year-long code, as well as two acquisition side channels that use doped PN codes that are easy to acquire.

Figure 2:
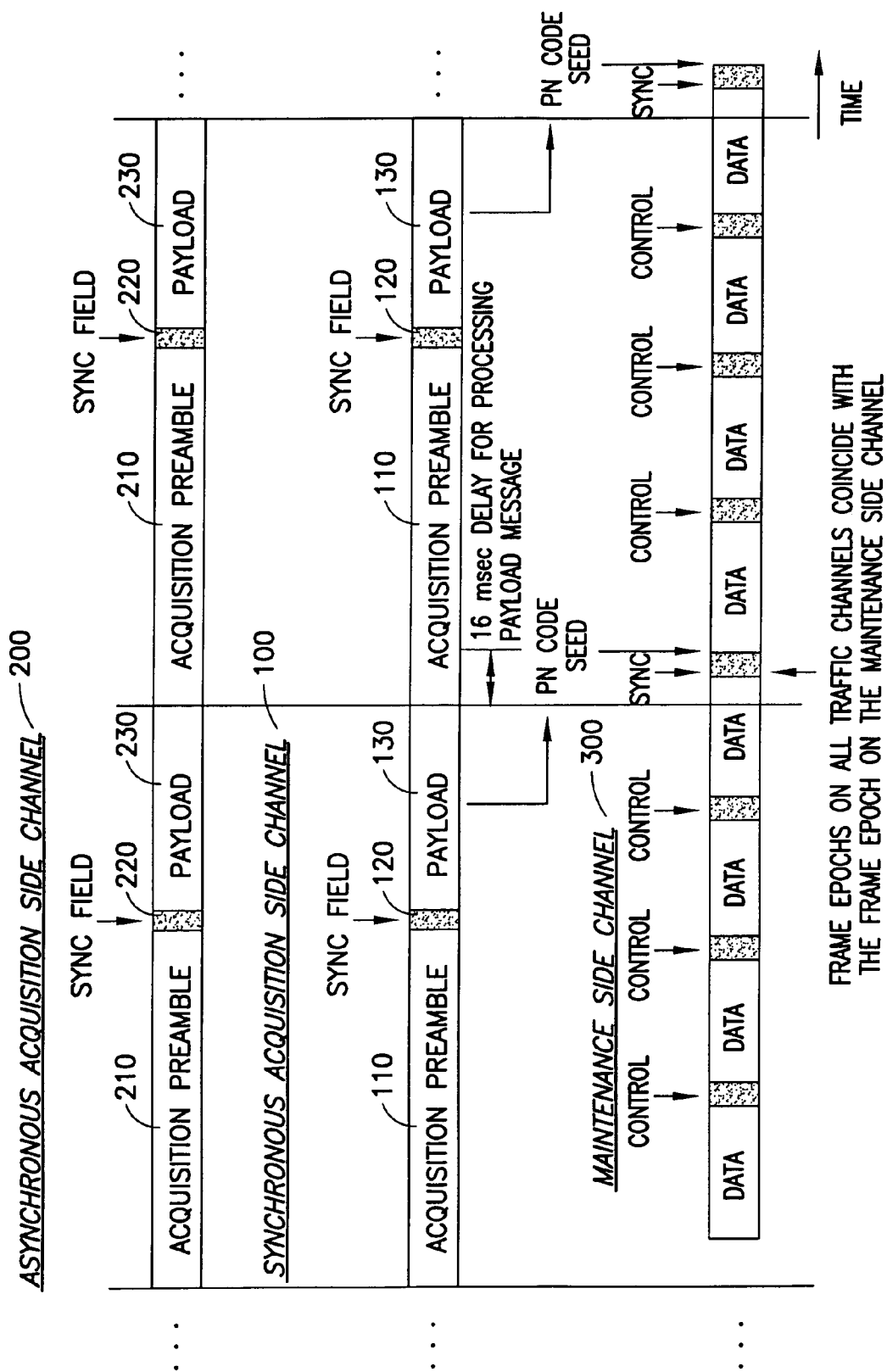
FIG. 2 depicts the structure of acquisition side channels and their relationship to the maintenance side channel in embodiments of the present invention.

As shown in FIG. 2, in one possible embodiment of the present invention the synchronous 100 and asynchronous acquisition side channels 200 can be implemented so that they are similar or identical, except that the synchronous side channel will undergo a PN code hop every few seconds for low probability of intercept ("LPI") and anti jamming ("AJ") protection, while the asynchronous acquisition side channel will not to insure that clock-unaware duplex programmable field units (PFUs) will have a way to synchronize. In the embodiment depicted in FIG. 2, preambles 110, 210; synchronization fields 120, 220; and payload sections 130, 230 of the signal transmitted in the acquisition side channel repeat indefinitely and the payload indicates the seed of the long PN code used to spread the signal transmitted on the maintenance side channel on the next frame boundary. Each acquisition channel runs at 500 bps rate with ½ turbo code and the frames on all of these side channels are 1.024 seconds long.

As FIG. 2 illustrates, preambles 110, 210; synchronization fields 120, 220; and payloads 130, 230 repeat indefinitely on the acquisition side channels. The preambles 110, 210 and payloads 130, 230 of acquisition signals transmitted in these channels will employ doped PN codes the construction of which will be described in the following sections of this disclosure. Each preamble will provide time for 16 dwells of 16 symbols each to search the chip phase, chip frequency and carrier frequency uncertainty range.

Other embodiments may differ from the details set forth with respect to the system depicted in FIG. 2. For example, a system may operate without a synchronous acquisition side channel, or without an asynchronous side channel.

TABLE 1

| | | | | |
|---|---|---|---|---|
| $R_s$ | 500 | symbols/sec | | |
| $R_{code}$ | 0.50 | Unitless | | |
| $R_b$ | 500 | bits/sec | | |
| | | Preamble | | |
| $N_{dwell}$ | 16 | symbols | 32 | Msec |
| n | 16 | Dwell times allowed for lock | | |
| $T_{RXsetup}$ | 4 | symbols | 8 | Msec |
| Sync | 13 | symbols | 26 | Msec |
| $T_{phase}$ | 15 | symbols | 30 | Msec |
| $B_{preamble}$ | 288 | symbols | 576 | Msec |
| | | Burst Payload Header | | |
| Encryption | 64 | bits | 128 | Msec |
| CRC Checksum | 16 | bits | 32 | Msec |
| Total | 80 | bits | 160 | Msec |
| | | Burst Payload Data (Message Type 0) | | |
| Long Code PN Seed | 128 | bits | 256 | Msec |
| Time to traffic Channel Commencement | 16 | bits | 32 | Msec |
| Total Payload | 224 | bits | 448 | Msec |
| Total Burst | 512 | symbols | 1024 | Msec |

The time required of a PFU to lock will depend upon the number of uncertainty cells that can be checked in parallel, which might vary from PFU to PFU. Some premium PFUs with a larger number of FPGA gates will be able to lock quickly, while other less-capable PFUs might require a longer time to lock. As an example, if a PFU is designed to have ¹⁄₁₆ of the FPGA gates of the hitchhiker's single search engine CCA then since there are 16 dwell times per preamble and roughly 32 chip/carrier frequency bins that must be searched, thus the PFU should be able to lock within two frames (2.048 seconds). This lock time would be achieved with approximately 92% probability if Es/No=8 dB.

The payload is encoded with the rate ½ turbo coded QPSK, while the preamble is unencoded QPSK symbols. The only information carried in the payload header is a public key encryption field (assuming some kind of public key encryption scheme is used), as well as a CRC checksum to validate that there are no errors in the payload. The encrypted payload data contains the seed of the long-code used to spread the target signal transmitted on the maintenance side channel 300 16 milliseconds after the end of the acquisition side channel frame. This fixed 16 msec time offset between the acquisition side channel frame epochs and the maintenance side channel 300 frame epochs provides the PFU processor with time to read the long PN code seed for the next frame boundary on the maintenance side channel 300. The PFU will switch to this side channel as soon as it has learned the seed.

Once on the maintenance side channel 300, the PFU will use the synchronization words to quickly synchronize itself and will then search for additional synchronization fields to insure that it is locked. Once some number of valid synchronization fields is found in a row (perhaps twice) then the PFU acquisition process will be complete.

If a PFU loses lock on the forward downlink during normal operation, and if it fails to relock with in some programming search time, it will be able to drop back to this same initial acquisition procedure to relock with the system.

The PN code used on the maintenance side channel 300 will be a very long nonlinear code, which is distinct from any used on the reverse uplink. Because the PFUs will use the maintenance side channel 300 as a trafficking channel, it will be broadcast with a disproportionate amount of power for its rate, 500 bps. Since the rate of the channel is very low, it will require relatively little power compared with the higher-rate traffic channels. However, it will be easier to detect by even the most disadvantaged PFU receivers, if it is allocated a disproportionate amount of power for its rate. It is envisioned that 3 or 10 dB of extra power will be allocated to this low rate channel. This implies that the energy per bit seen by the PFU receivers will be higher than on a normal channel by 3 or 10 dB. However, since the rate of the channel is so low, this extra power will have a negligible effect on the multi-user interference level seen by the higher rate channels. The power allocation between channels can be varied easily, because all channels will be modulated together in one card in the hitchhiker, namely the baseband combing modulator CCA.

In addition to using the maintenance side channel 300 as a trafficking channel, the PFU will also listen to the data sent on the maintenance side channel 300 as long as it is not assigned to a traffic channel. All inactive duplex PFUs will listen to maintenance side channel by default when they are not involved in a traffic channel session. If the hitchhiker wishes to communicate with the PFU privately, a command will be sent down the maintenance side channel to the PFU to switch to that PFU's traffic channel.

In FIG. 2, the frame structure of the maintenance side channel is illustrated. The frame structure of this side channel will be the same as the 500 bps rate frames used on the reverse uplink. Messages passing through this side channel are packetized in the same control packet format used in the control fields of the traffic channels. While these control packets are normally sent using the control fields on traffic channels, they are sent in the data fields on the maintenance side channel 300. The control fields of the maintenance side channel 300 are currently unused (reserved for future use).

The hitchhiker will use decoy messages on the forward maintenance side channel to insure that any eavesdropper sophisticated enough to lock to this side channel will not be able to detect any useful activity-level information. When the hitchhiker commands a PFU to switch to an active channel, only the hitchhiker and that particular PFU will know what traffic channel PN code is implied. This will make it difficult for eavesdroppers to listen to traffic channels.

On the reverse uplink, where PFUs burst to the hitchhiker, a similar CDM self-jamming technique can be used to protect the short-code preambles of the side channel signals.

Figure 3:
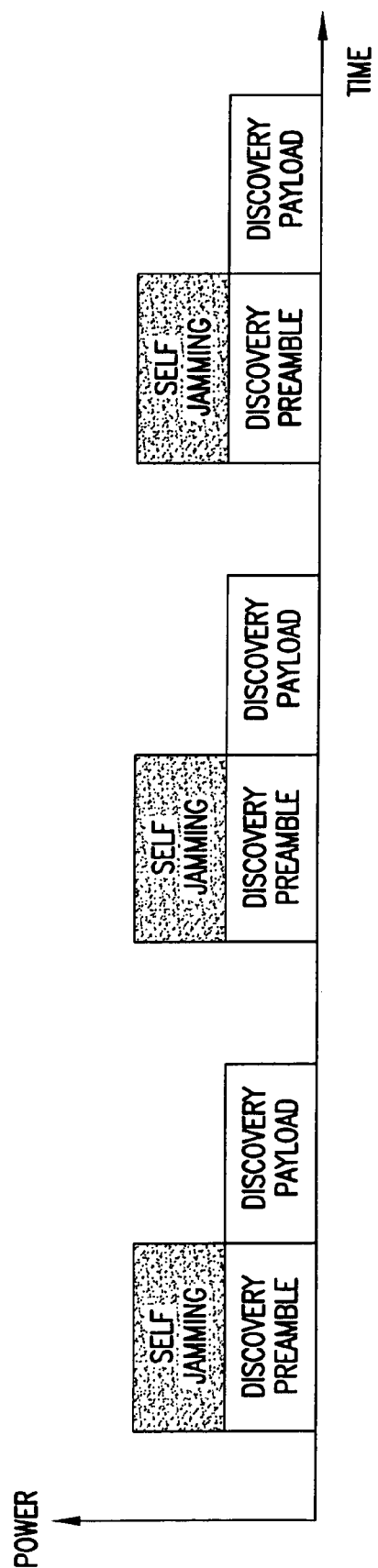
FIG. 3 depicts a time line showing when self-jamming should occur in embodiments of the present invention.

The transmission can be cloaked by burying it in self-generated noise if the link budget permits the use of extra transmit power. From the receiver's perspective, this self-jamming can easily be accommodated by the large processing gain employed. If the PFU buries the true signal in noise that is 10 dB stronger than the desired burst, it will negligibly impact the hitchhiker's ability to detect the desired burst, while making it very difficult to identify the preamble PN code for the eavesdropper. Clearly, there is a tradeoff of making the desired signal in noise, with the diminished LPD characteristics and worse link-budget of a higher-strength signal-plus-noise burst. It is presumed, as shown in FIG. 3, that the self-jamming would only occur during the side channel burst preamble, since the side channel burst payload and traffic channel data will be spread with a very long code that very rarely repeats.

In addition to the direct-sequence spread spectrum embodiments set forth previously, further embodiments of the present invention operate in hybrid Time Division/Direct Sequence Spread Spectrum communications systems (TD/DSSS); hybrid Frequency Division/Direct Sequence Spread Spectrum communications systems (FD/DSSS); and frequency hopping spread spectrum communications systems. In hybrid TD/DSSS systems the acquisition information carried in a direct sequence spread spectrum acquisition signal may further comprise time slot information indicating in which time slot or slots a target signal would be transmitted. In hybrid FD/DSSS systems the acquisition information carried in a direct sequence spread spectrum acquisition signal may further comprise frequency band information indicating in which frequency band or bands a target signal would be transmitted. In frequency hopping spread spectrum communications system, the acquisition signal would contain information concerning a frequency hopping pattern used to transmit a target signal.

In addition, either one or both of the acquisition signal and the target signal may be transmitted continuously or in bursts.

In direct-sequence spread spectrum embodiments the present invention uses a plurality of constituent codes or sub-codes to construct a composite long code such as the pseudorandom number (P/N) codes used in a CDMA communication system for use with, for example, the preamble 110, 210 and payload portions 130, 230.

Unlike PN codes of the prior art, the multi-rate composite codes according to the present invention may be constructed from two to any number of constituent codes while autocorrelation of those codes is destroyed or significantly reduced by doping. For purposes of this description and the claims, a constituent code is represented by a capital letter A, B, C, etc., and elements of the codes are represented by lower case letters with subscripts, such as elements $a_1, a_2, a_3, \ldots a_N$ for code A that has a total of N elements. A lower case letter in the subscript indicates a variable number, such as $a_n$ represents an $n^{th}$ element of the code A where n varies from 1 to N. An upper case letter in the subscript indicates the final element of the code, such as $a_N$ represents the $N^{th}$ element of the code A that has N elements.

By way of example, consider two constituent codes A and B, wherein A is a first constituent code having N=ten elements and B is a second constituent code having M=ten elements. The composite code of the present invention need not be constructed from equal length constituent codes. The elements of the constituent codes may be any real or complex valued quantity, though in practice the elements are typically either $\pm j$ (where $j=\sqrt{-1}$) or $\pm 1$. The resulting composite code will include at least 100 elements, and will exhibit ten code segments each bearing ten composite elements. Additional elements may be disposed between the code segments. The first code segment is obtained by operating the first element $b_1$ of the second constituent code B with each element $a_1$, $a_2, \ldots a_N$ of the first constituent code A using an exclusive OR operation. Label this code segment as $Ab_1$. The second code segment is obtained by similarly operating the second element $b_2$ of the second constituent code B with each element $a_1, a_2, \ldots a_N$ of the first constituent code A to yield $Ab_2$. This continues for each of the M elements of the second constituent code, yielding ten code segments each of length ten elements. The resulting composite code is then written as AB. The code segments $Ab_m$ are arranged serially, and may have additional code elements disposed between the segments as is described in U.S. patent application Ser. No. 10/915,776 (which is hereby incorporated by reference in its entirety as if fully restated herein). The various codes and nomenclatures are depicted below.

$1^{st}$ constituent code A: A=$a_1, a_2, a_3, \ldots a_N$;

$2^{nd}$ constituent code B: B=$b_1, b_2, b_3, \ldots b_M$;

1$^{st}$ code segment: $Ab_1 = a_1 \oplus b_1, a_2 \oplus b_1, a_3 \oplus b_1, \ldots a_N \oplus b_1$;
2$^{nd}$ code segment: $Ab_2 = a_1 \oplus b_2, a_2 \oplus b_2, a_3 \oplus b_2, \ldots a_N \oplus b_2$;
basic composite code: $AB = Ab_1, Ab_2, Ab_3, Ab_M$ It is clear from the above that each code segment has the same length N, and the composite code has M code segments arranged seriatim for a total of N*M elements in the composite code (barring the addition of further elements between code segments). Because the above example constructs the composite code from two constituent codes, it will be termed a two-layer composite code. It is noted that the above code segments are constructed by operating code elements by an exclusive-or operation. That is valid for real-valued code elements, but a multiplication of elements may be required for imaginary code elements. For simplicity, this description generally presumes real code elements combined with an exclusive-or operation. Extension of these teachings to imaginary code elements follows logically from the above distinction.

Composite codes may be in three, four or more layers, constructed from three, four, and any number of constituent codes, respectively. For example, consider a third constituent code C having L elements $c_1, c_2, c_3, \ldots c_L$, combined with the constituent codes A and B above. The first code segment of the composite code would be each element of AB operated with an exclusive OR with the first element $c_1$ and would be abbreviated $ABc_1$, the second code segment would be each element of AB similarly operated with the second element $c_2$ abbreviated $ABc_2$, and so forth to yield L code segments each of length N*M, and the resultant three-layer composite code ABC would exhibit a length N*M*L, barring added code elements between the segments as noted above.

It is unnecessary that the constituent codes be orthogonal to one another. So long as the constituent codes A, B, etc. are non-repetitive in their lengths, the code segments will be non-repetitive in their lengths. That is, for a composite code with segments $Ab_1, Ab_2, Ab_3, \ldots Ab_N$, arranged seriatim, each code segment $Ab_n$ is non-repetitive. A composite code wherein code segments are arranged seriatim with no intervening elements is termed herein a basic composite code.

Figure 4C:
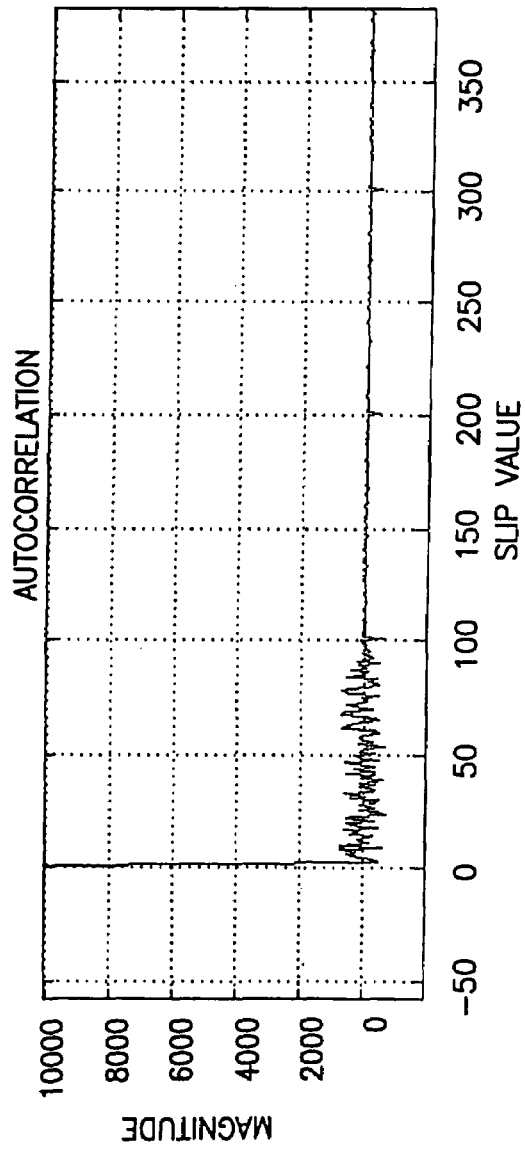
FIGS. 4C-4D are expanded portions of FIGS. 4A-4B, respectively.
Figure 4D:
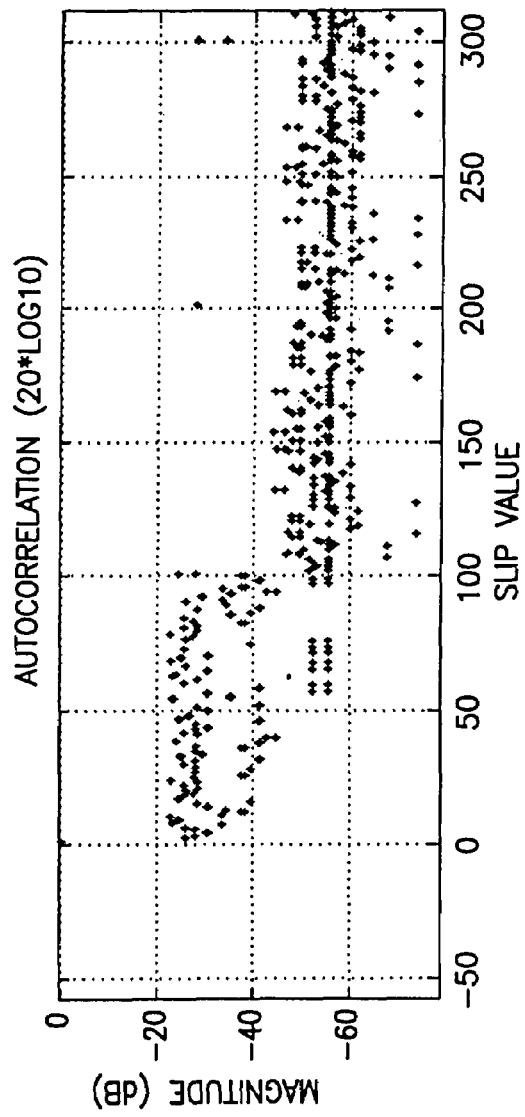

A disadvantage inherent in a basic composite code is that its autocorrelation is poor due to the repetitive nature of the composite code AB. Sub-code A repeats (with an associated multiplier) for every element in sub-code B. For example, assume a basic composite code AB is generated using the above algorithm from two 100-length sub-codes. AB has length 10,000 and contains an embedded repetition every 100 elements as can be seen in the code's autocorrelation function shown in FIGS. 4A and 4B, which are created by correlating AB across two successive duplicates of itself. FIG. 4A is a linear graph and FIG. 4B is logarithmic showing the same data. Peaks can be seen that are spaced at periodic intervals of 100, the length of the A sub-code. These peaks can be seen to be as much as 18 dB below the fully aligned value. These characteristics are more evident at FIGS. 4C and 4D, which are expanded views showing the first several hundred elements of the basic composite code of FIGS. 4A and 4B, respectively. In FIG. 4C, variance about the aligned value is high during the first hundred code elements, followed by a negative spike at each 100-element interval. In FIG. 4D, the first hundred elements exhibit a plateau, followed by more normalized autocorrelation except at each vertical line representing a 100$^{th}$-element. Referring back to FIGS. 4A and 4B, it is apparent that a similar variance and plateau exists at the final 100 elements of the basic composite code. In a communication system, especially one in which security depends at least partly on covertness of communications, these peaks and their periodic occurrence could be used by an eavesdropper to decipher or jam the coded messages.

Figure 5:
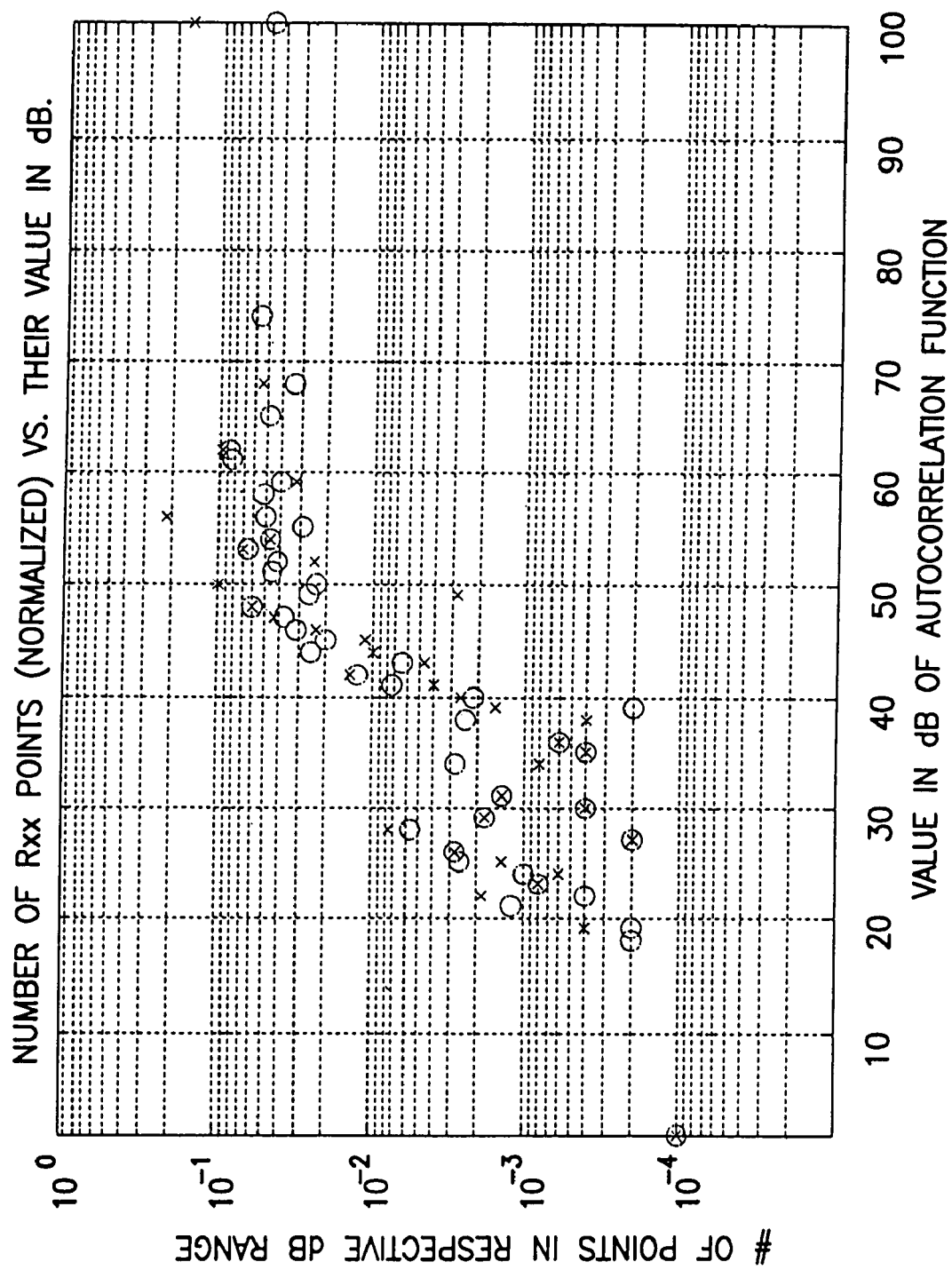
FIG. 5 is a histogram showing the same data as in FIGS. 4A-4B, but where output values are binned into 1 dB wide bins.

The basic composite code autocorrelation data of FIGS. 4A-4B is plotted as a histogram in FIG. 5, where the output values are binned into 1 dB wide bins and the number of values in each bin is displayed as a fraction of the total number of autocorrelation values (10,000 in this case). For example, there is only one point (0.01% of the total, plotted at $10^{-4}$) that has an output value of 0 dB. That is the point where alignment occurs. There is one value (0.01%) at −17.1 dB and two values (0.02%) at −18.4 dB that represent the +90° symbol boundary for QPSK modulation. These are the maximum sidelobes.

As a comparison, prior art FIGS. 6A and 6B are linear and logarithmic graphs, respectively, of a random P/N code of length 10,000. There are no peaks by which to distinguish the communication from other electronic noise, and no periodicity by which to reverse-engineer construction of the code. Thus, for a P/N code used in a discovery burst as described above, desirable autocorrelation properties include minimal significant autocorrelation sidelobes, and sidelobes that are small in value. For the auto correlated random codes of FIGS. 6A-6B, the variance is −39.8 dB±0.1 dB and is uniform across all correlated elements of the code, including the first and final 100 elements. For the basic composite code of FIGS. 4A-4D, the variance is −42.0 dB and −41.5 dB, with non-uniformity of variance as noted.

Figure 7:
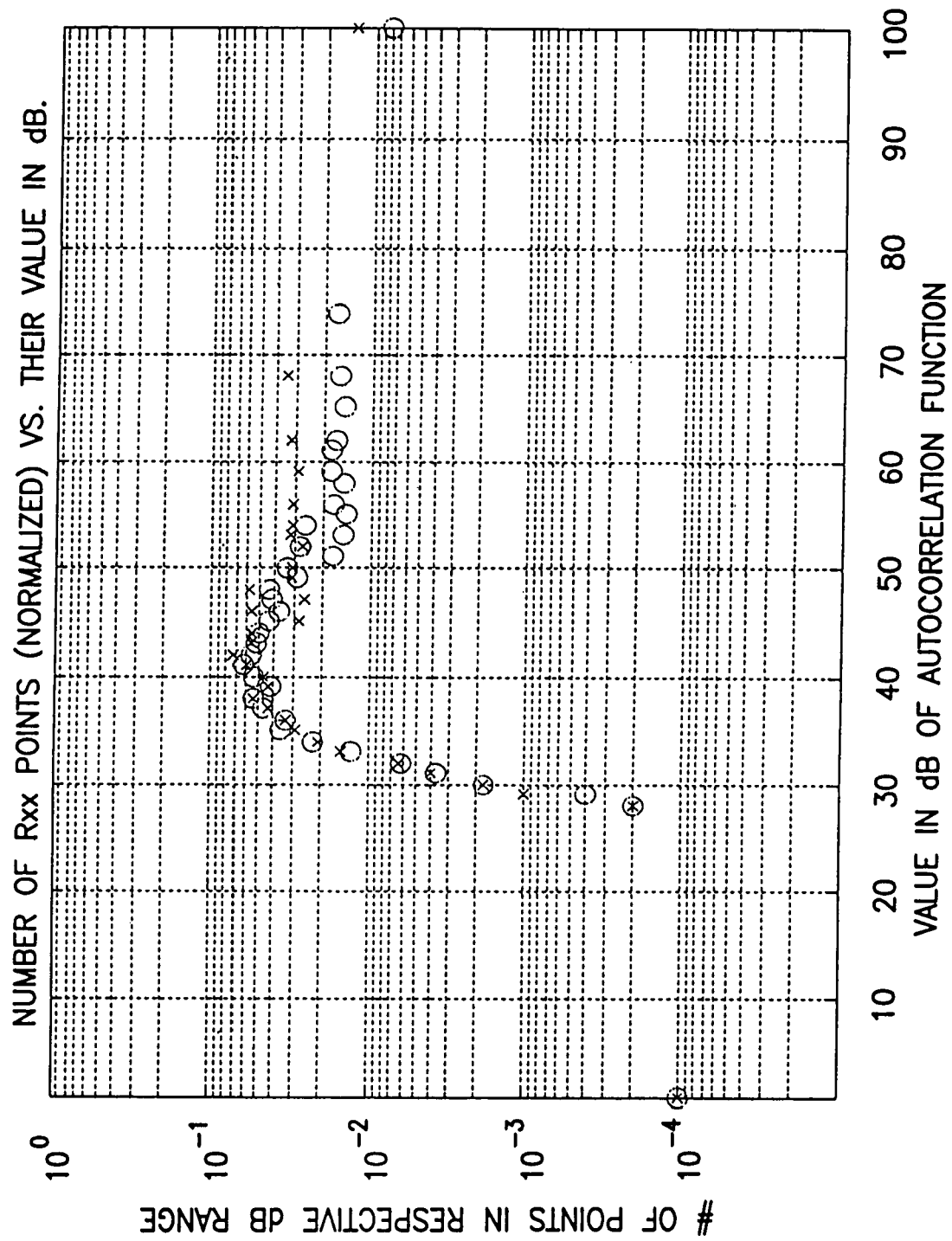
FIG. 7 is similar to FIG. 5 but for the random code of FIGS. 6A-6B.

The random code autocorrelation data of FIGS. 6A-6B is plotted as a histogram in prior art FIG. 7, similar in type to FIG. 5. The maximum sidelobes occur at two points (0.02%): −27.8 dB and −27.9 dB.

To improve the autocorrelation properties of the basic composite code, the periodicity of the code segments must be defeated. One way to do this is to insert elements from an additional sub-code at various places into the composite code. This is termed herein as 'doping' the basic composite code, and the additional code from which the doping code elements are taken is termed the doping code. Placement of the elements of the doping code into the composite code can be done in any manner, but the placement should be such as to "randomize" the composite code thereby reducing the periodic peaks seen in the autocorrelation function. The simplest manner to do so is to insert a non-repeating number of doping elements between each pair of code elements, or after each code element, of the basic composite code.

Consider again the composite code made from two constituent codes, A and B, with lengths N and M respectively. One possible method of inserting the doping code is to insert an increasing number of dope-code elements after each cycle or block of the N elements of the A constituent code. One dope-code element is placed after the first repetition of A (the first code segment $Ab_1$), two dope-code elements are placed after the second repetition of A (the second code element $Ab_2$), and so on. The elements and structure of such a doped composite code is diagrammed below, recognizing that $Ab_m$ represents an entire code sequence of a basic composite code.

basic composite code: $AB = Ab_1, Ab_2, Ab_3, Ab_M$
doping code $C = c_1, c_2, c_3, \ldots$
doped composite code: $Ab_1, c_1, Ab_2, c_2, c_3, Ab_3, c_4, c_5, c_6$, etc.

During the autocorrelation process, the above structure ensures that for shifts greater than N (the length of the A sub-code) only one N-length code segment will overlap with another. The periodicity of the code segments is suppressed by consecutively increasing the number of dope-code elements inserted after each code segment. This particular method of doping will eliminate the repetitive peaks spaced every N shifts in the autocorrelation function.

To show the improvement in the autocorrelation properties using a specific example, consider again the length 10,000 AB code made from two length 100 sub-codes A and B. Successively inserting an increasing number of elements from a doping code using the specific technique above requires that the length of the doping code to be $(M+1)\times(M/2)=5050$ where M is the length of the B constituent code. The doped code would be 15,050 elements in length. To compare a similar length composite code as used in FIGS. 4A-4D, let the B constituent code be 73 which makes the doping code equal to $(73+1)\times(73/2)=2,701$, where the number of doping elements inserted between code segments of a basic composite code increase by one in each sequential insertion. The doped composite code includes 10,001 elements; $(100\times73)+2701$. The autocorrelation function of this code is shown in FIGS. 8A-8D, which are similar in format to FIGS. 4A-4D but for the above-noted doped composite code. There are no apparent periodic peaks that indicate the composite code's structure. All values are also much less than 20 dB below the fully correlated value. The plateau at correlation of the first 100 elements of the basic composite code is suppressed in the doped composite code as evident in FIGS. 8C and 8D. The histogram distribution for the doped composite code at FIG. 9 is similar to that of the random code of FIG. 7. Further, the maximum sidelobes for the doped composite code occur at 24.7 dB and −24.8 dB, and the variance for the correlated doped composite codes are −38.9 dB and −39.0 dB.

Note that for slips less than 100 chips from the aligned state the result is the same as the 100×100 basic composite code; high sidelobes at the −16 dB value. In this situation there remain 73 100-length sub-codes sliding across each other all at the same time. However, once the code is more than 100 chips from perfect alignment, the doping prevents more than one of these 100-length sections from becoming aligned again at any one time, advantageously preventing the peak every 100 slips as seen in the 100×100 code.

The creation of a doped composite code is not limited to the addition of increasingly incremented numbers of doping code elements between the code segments of a basic composite code. Any method of inserting additional elements into a basic composite code to scramble or randomize the code could be used. A doped composite code made from two sub-codes may have an algorithm to insert doping elements into one of the constituent codes and another algorithm to insert doping elements into the other constituent code. A third algorithm may be used to insert elements of the same or different doping code into an intermediate composite code that is created from the doped constituent codes. The doping code may be separate from the constituent codes that are exclusively-OR'ed (or multiplied) together, or may be one of the constituent codes or some combination of them.

Considering that one preferable use for these composite codes is in the preamble of a discovery burst, it is not optimum to construct the basic composite code from only 173 elements yet retain 2701 additional doping elements merely to randomize the P/N code. Constructing the doping code from constituent codes just as the basic composite code is constructed may be viable, but would impose a periodicity that would exhibit itself only in the latter elements of the P/N code where larger numbers of doping elements are grouped together. The resulting pattern would not be equally spaced peaks in an autocorrelation graph, but rather peaks that recur with a steadily increasing frequency with higher numbered elements of the doped composite code. That pattern of increasing frequency of peaks may be masked somewhat by the lengths of code segments between which the doping elements are interspersed, but at least in theory such a pattern could undermine the code's security. A more efficient and secure implementation is to construct the composite code from more than two constituent codes, and dope at each layer where constituent codes are combined.

For example, consider three constituent codes of lengths A=100 elements, B=9 elements, and C=11 elements, and two doping codes D1 having elements $d1_1, d1_2, d1_3, \ldots$ etc., and D2 having elements $d2_1, d2_2, d2_3, \ldots$ etc. Codes A and B are exclusively-OR'ed together to construct a first-layer basic composite code AB having code segments $Ab_1, Ab_2, Ab_3, \ldots Ab_9$, each of length 100. Between each of the first-layer code segments is added increasing numbers of the first doping code D1, to yield $Ab_1, d1_1 Ab_2, d1_2, d1_3, Ab_3, d1_4, d1_5, d1_6, Ab_4, \ldots Ab_9, d1_{37}, d1_{44}, d1_{45}$. D1 therefore has 45 elements. The doped first-layer is AB doped with D1 (annotated $^{D1}AB$), which is then exclusively-OR'ed with each of the eleven elements of the third constituent code C to yield the second layer composite code ($^{D1}AB$)C, which at this point is only doped at one layer. Following each sequential code segment element ($^{D1}AB)c_k$ of the second layer composite code ($^{D1}AB$)C is added an increasing number of doping elements d2 from the second doping code D2. The resulting two-layer composite code doped on each layer is ($^{D1}AB$)c, $d2_1$, ($^{D1}AB)c_2$, $d2_2$, $d2_3$, ($^{D1}AB)c_3$, $d2_4$, $d2_5$, $d2_6$, $\ldots$, ($^{D1}AB)c_{11}$, $d2_{55}$, $d2_{56}$, $d2_{66}$. D2 must have 66 elements to dope at the second layer as described. The resulting code is length $(100\times9+45)\times11+66=10,461$, and takes only 231 elements to form as opposed to the 2701 elements used for doping alone in the length 10,001 doped composite code first introduced above.

It should be noted that if the doping code is a small percentage of the overall code, then the doping portion of the code could be essentially ignored in the matched filter with only a small loss in detection energy. This is advantageous when the complexity of collecting the energy of the doping portion of the code is high, but the energy gained is small. For example, in the 100×73+2,701 doped composite code noted above, the length of the doping code (2,701 elements) can cause a 1.3 dB loss (2,701/10,001) in the detection process if the doping code's energy is discarded to simplify the receiver's implementation. The three layer composite code with doping on two layers described above [(100×9+45)× 11+66=10,461 code length] represents only a 0.24 dB loss if the doping code energy is discarded in the receiver.

Figure 8A:
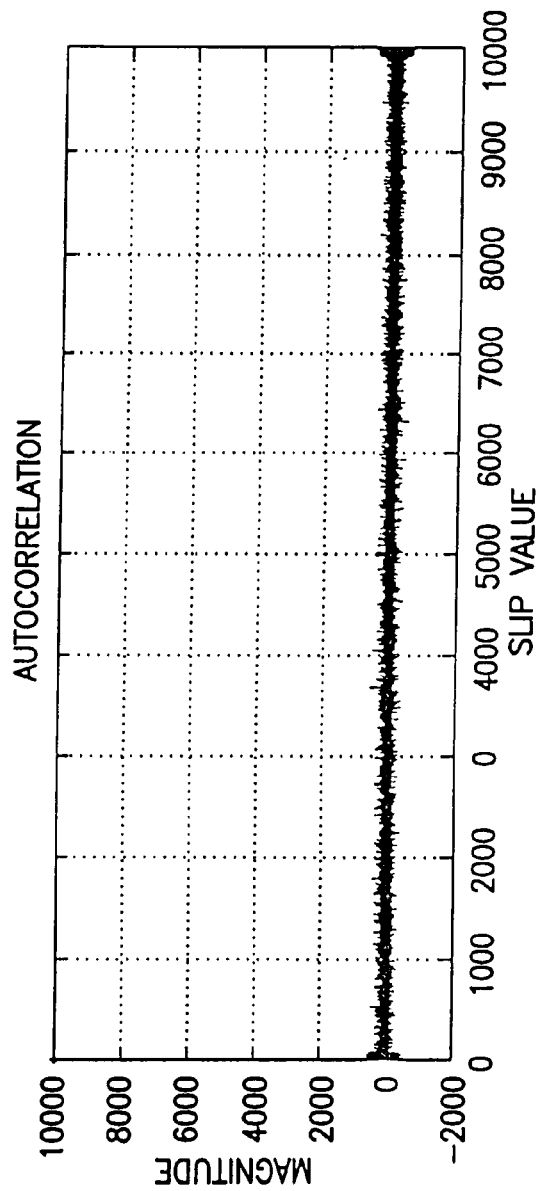
FIGS. 8A-8B are similar respectively to FIGS. 4A-4B, but for a doped composite code as described herein made from two constituent codes of lengths 100 and 73, and doped with 2701 random members between code segments of the basic composite code.
Figure 8B:
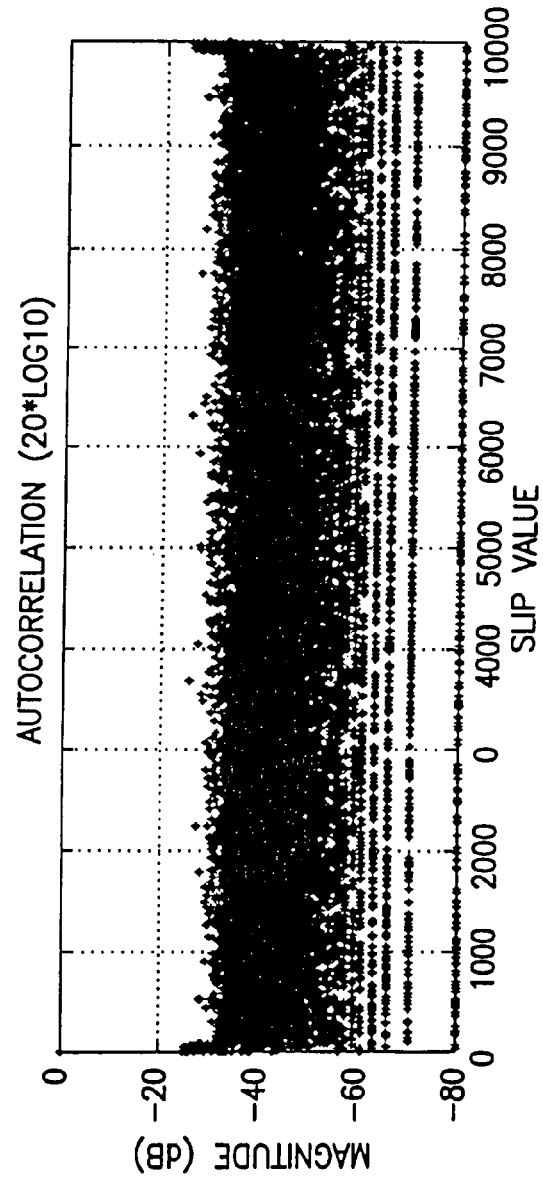
Figure 8C:
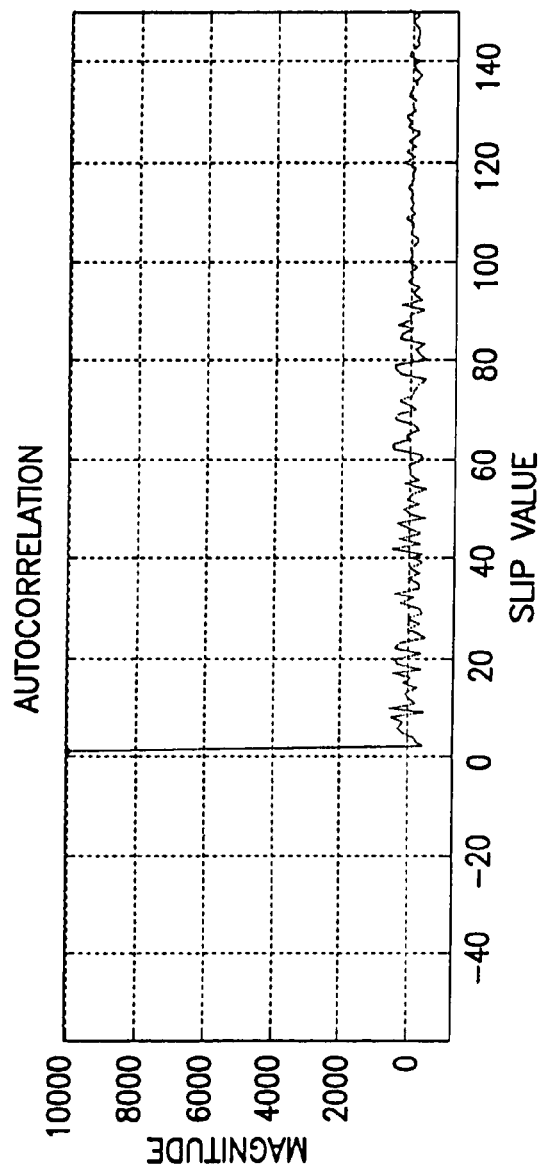
FIGS. 8C-8D are expanded portions of FIGS. 8A-8B, respectively.
Figure 8D:
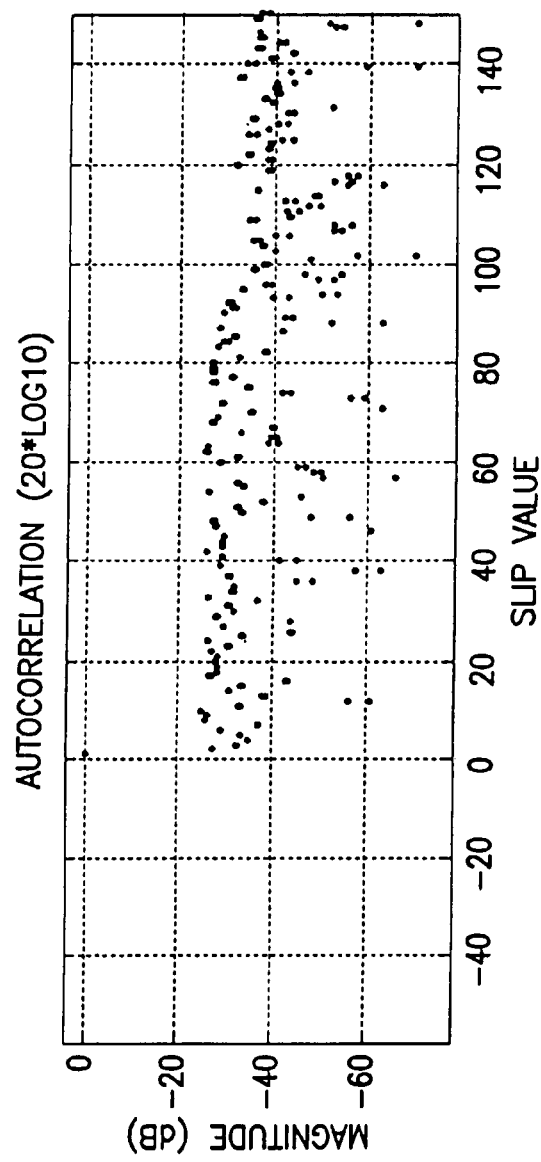
Figure 9:
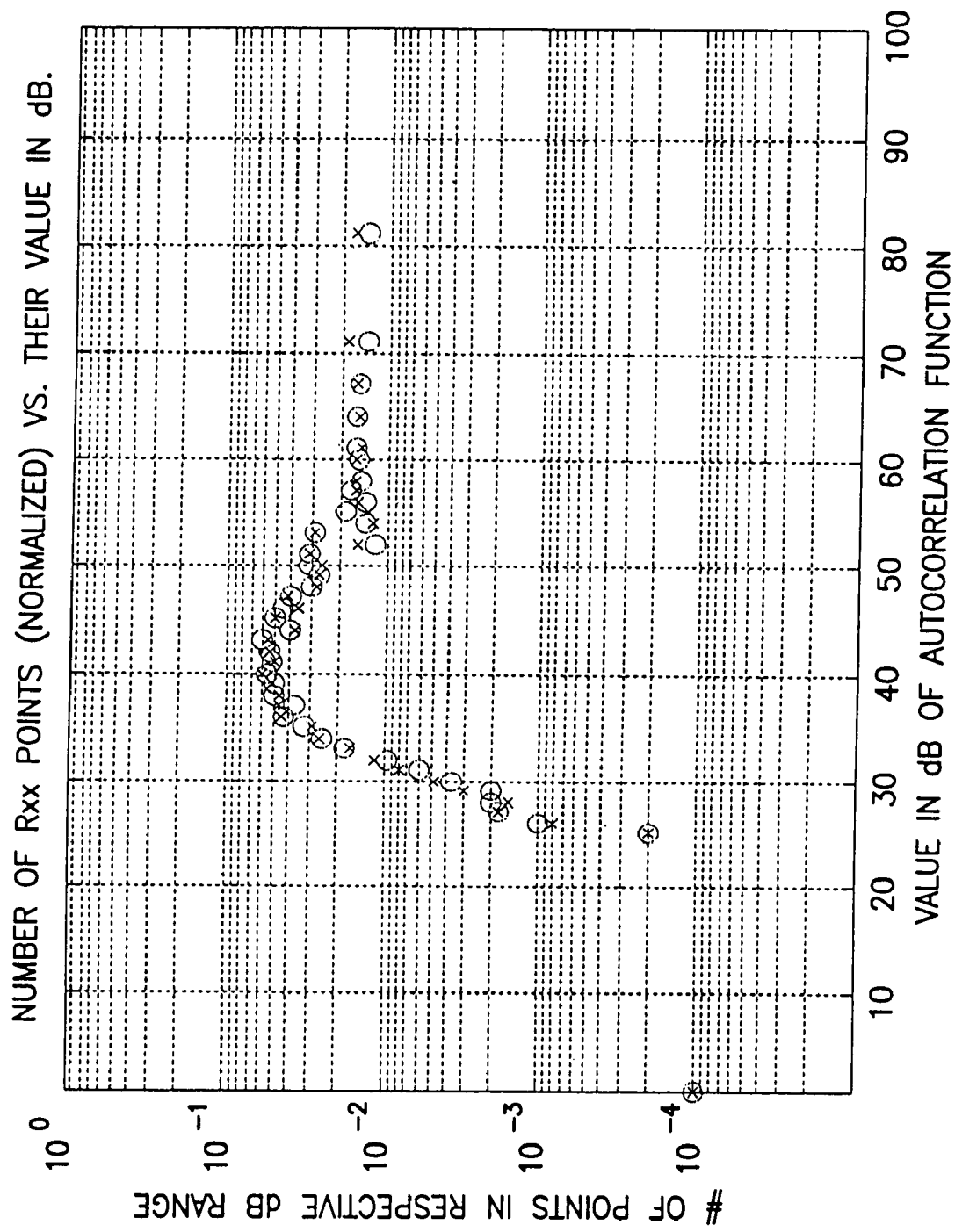
FIG. 9 is similar to FIG. 5 but for the doped composite code of FIGS. 8A-8B.
Figure 10A:
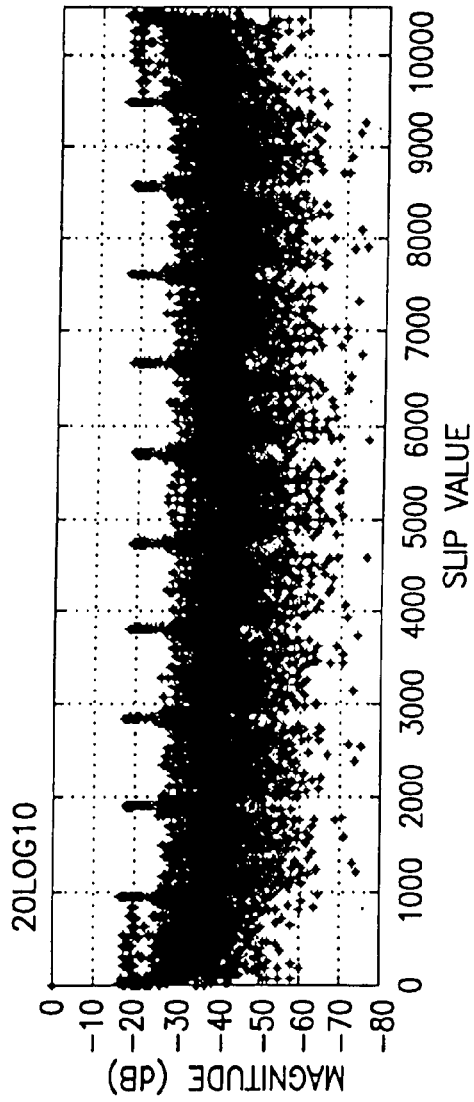
FIGS. 10A-10C are similar to FIGS. 8B, 8D, and 9, respectively, but showing data for a three layer composite code doped at the second and third layers, with length 10,461.
Figure 10B:
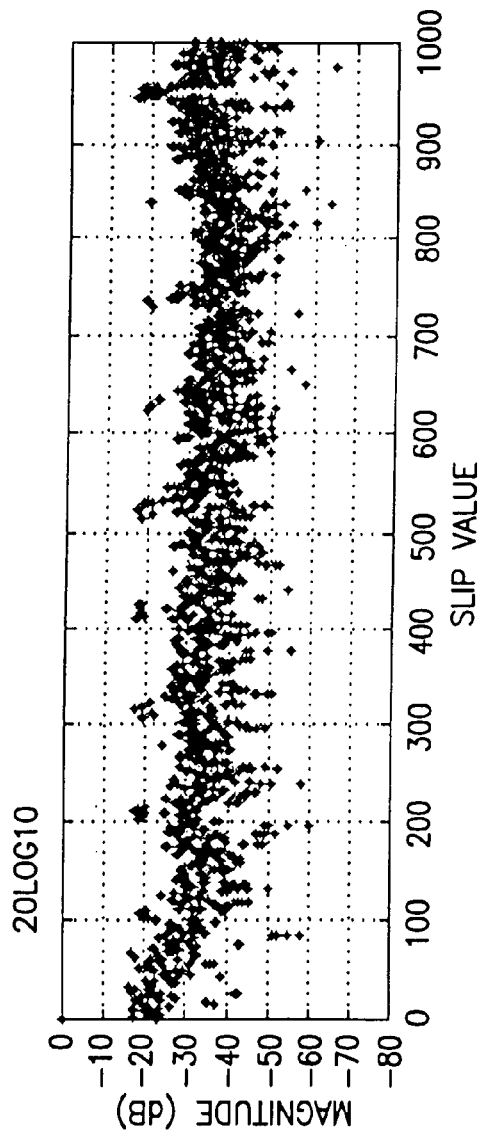
Figure 10C:
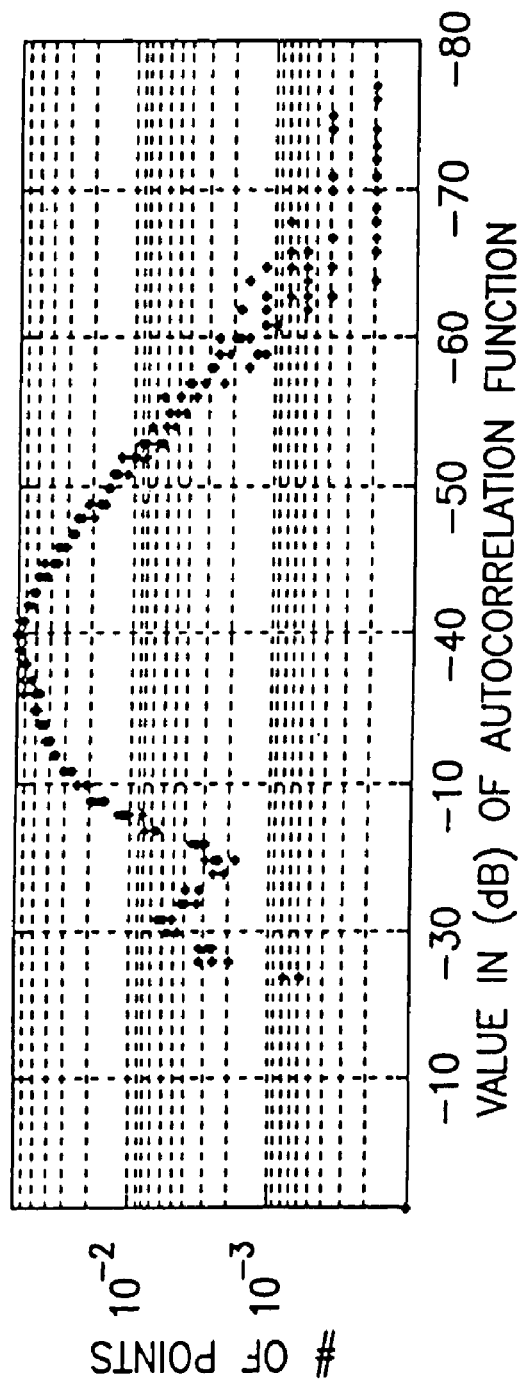

FIGS. 10A-10C show the autocorrelation of this code doped at two levels, wherein FIG. 10A is a logarithmic autocorrelation graph similar in format to FIG. 8B but for the 10,461 length code, FIG. 10B is an expanded view of the first 1000 elements, and FIG. 10C is a histogram similar in format to FIG. 9. Random codes were used for the three constituent codes and for the two doping codes. The peak sidelobe is −16.2 dB and the variance is −35.5 dB. The behavior here is similar to the 100×100 random code of FIG. 6B although the peak sidelobe is lower. There are high sidelobes for close-in slips and there are periodic peaks spaced approximately every 1000 slips. More precisely, these periodic peaks are spaced every 100×9+45=945 slips. This is the length of the first level composite code made from the first two constituent codes A and B and associated doping code D1. The doping used during the repetitions of the outer second-level code do, in fact, prevent no more than one overlap of the inner first-level code, but the length of the inner first-level code (945 chips) is quite long compared to the length of the total code. So even though there is only one overlap of this 945-length inner code, it is significant enough to cause the high periodic peaks.

A comparison of FIGS. 10A-10C to FIGS. 8B, 8D and 9 and their underlying constituent and doping codes used to form the correlated composite codes illuminates the conflicting goals of low sidelobe values versus receiver implementation complexity (e.g. small number of doping chips and reduced number of filter taps). The inventors have experimented with several random constituent A codes by mapping their autocorrelation and selecting that exhibiting the lowest sidelobes. A non-exhaustive search yielded a constituent A code that results in approximately a 1 dB improvement in sidelobe for the resulting two-layer twice doped composite code as compared to that depicted in FIG. 10C. Further searching and tuning of the B and C constituent codes and the D1 and D2 doping codes should yield further improvement.

Figures 11A, 11B:
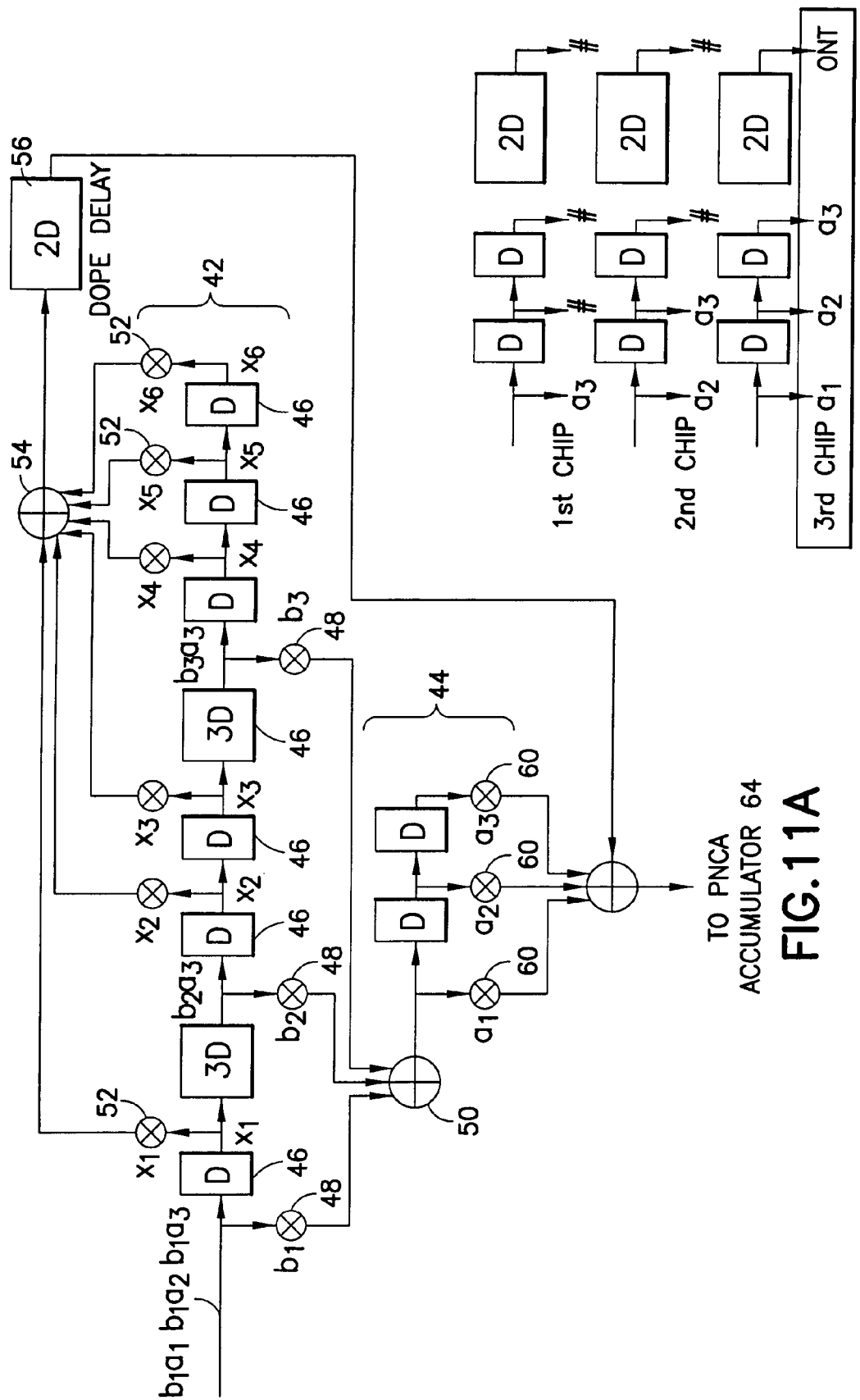
FIG. 11A is a block diagram of a matched filter for a 3×3 composite code doped on the second layer, where energy from the doping elements is preserved.
FIG. 11B is a conceptual view of chip slips at the first stage of FIG. 11A.
Figure 12A:
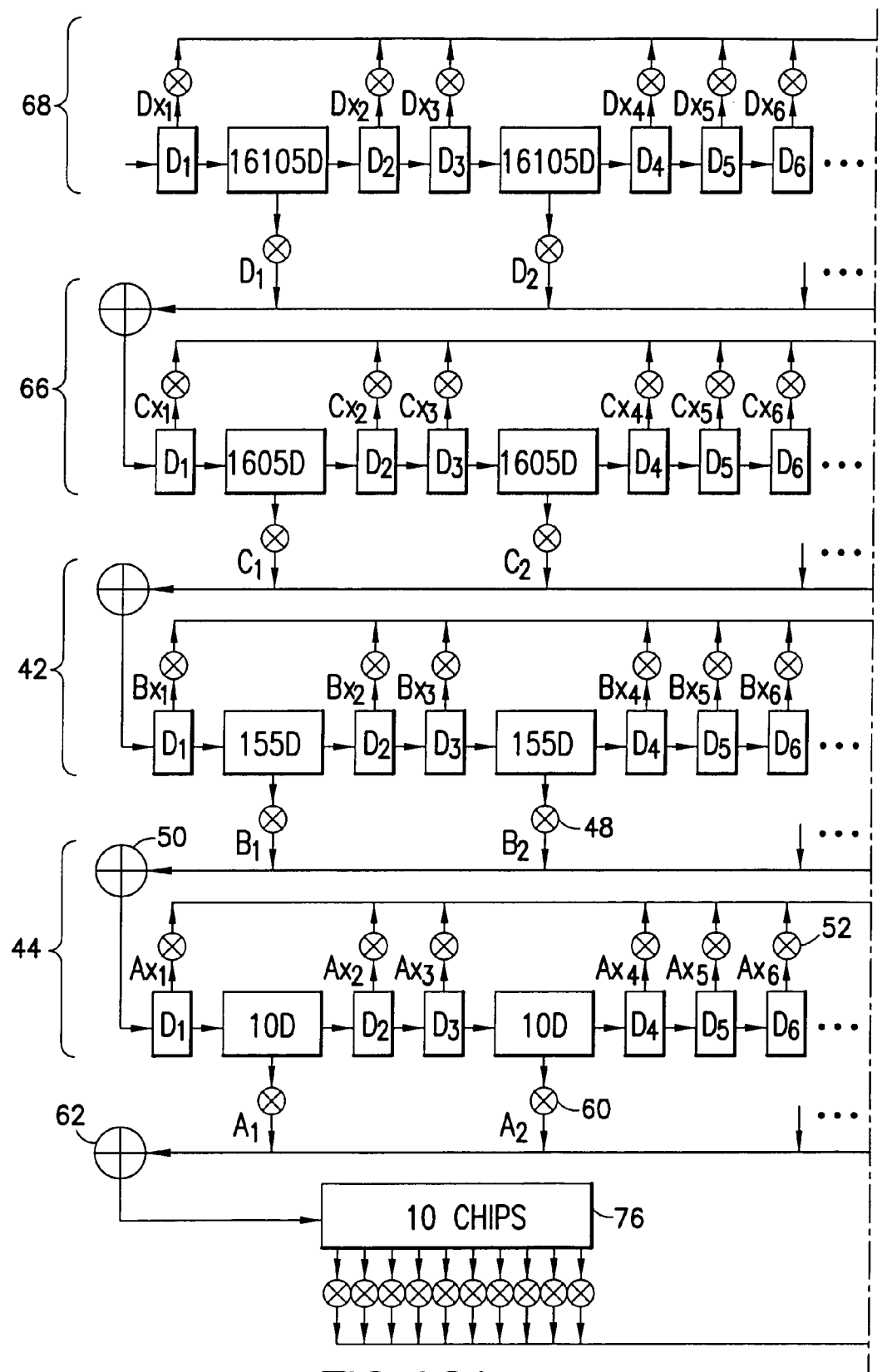
FIG. 12 is a block diagram similar to FIG. 11A but for a four-level composite code doped on every level.

The impact of limiting the size of the doping code is evident in the embodiment of a despreader shown at FIGS. 11-12. FIG. 11A is a block diagram of a matched filter or despreader for a composite code made from two constituent codes A and B, each of length 3 and having elements $A=a_1, a_2, a_3$ and $B=b_1, b_2, b_3$. The composite code is doped with a code X of length 6 having elements $x_1, x_2, \ldots x_6$, where each code segment Ab is followed by a sequentially increasing number of non-repeating doping elements x. The full doped composite P/N code on which the filter of FIG. 11 operates is then length 15 and has elements $^XAB=a_1b_1, a_2b_1, a_3b_1, x_1, a_1b_2, a_2b_2, a_3b_2, x_2, x_3, a_1b_3, a_2b_3, a_3b_3, x_4, x_5, x_6$. The longest sequence of doping elements x is three, and occurs at the end of the P/N code in this doping technique.

Consistent with the correlator of U.S. patent application Ser. No. 10/915,777, this matched filter 40 despreads the basic composite code in a second 42 and a first 44 stage, discussed in that order so the larger filter of FIG. 12 will follow logically. The second stage 42 includes a series of delay elements 46 and three constituent code taps 48 that feed into a second stage adder 50. The second stage also includes six dope code taps 52 that feed into a dope delay element 56. The constituent code taps 48 remove the B code from the filter input, each stripping one of the three B code elements and inputting the result into the second stage adder 50. The dope code taps 52 remove the dope code X from the filter input and the dope code filter tap outputs are summed at a dope code adder 54. As noted above, where energy in the dope code does not justify the increased hardware to recover it, the dope code may be discarded, and the dope delay 56 is unnecessary. The description below includes preserving the information carried by the dope code X.

The first stage 44 includes a series of delay elements 58 and three constituent code taps 60 for the A code. The output of these constituent code taps 60 is summed at a first stage adder 62, along with the output of the dope delay 56. The sum of the A code filter taps 60 and the dope delay element 56 are fed into a PNCA (P/N correlator accumulator) 64. A value is generated and stored in the PNCA at each chip slip state, or one each unit delay. It is noted that each of the delay elements in the first stage 44, which is the stage that strips the last constituent code (code A in this case), are unit delay elements that delay one chip, whereas not all of the other delay elements 46, 56 are unit delays. The particular delay length depends on the structure of the composite code and the constituent codes from which it is constructed. In this instance, the dope delay 56 is two unit delays and two of the second level delay elements 46 are three unit delays. While these multi-unit delays are each depicted as a single block in FIG. 9, they may instead be a series of unit delay block totaling as depicted.

FIG. 11B details individual chip slips at the first stage 44, which is a parallel filter, combined with the output of the dope delay element 56. Three clock increments or chip slips are shown. At a first clock or chip, the $a_3$ code element is correlated on time and present at the first tap 60 of the first stage 44. At a second clock or chip, the third A code element $a_3$ has passed the first delay element 58 of the first stage (which is a unit delay), remaining on time, and the second A code element $a_2$ is correlated on time and present at the first tap 60 of the first stage 44. Neither output from the dope delay element 56 at the first and second clocks is correlated on time. At a third clock or chip, the $a_3$ element has passed through the entire first stage 44, the $a_2$ element is tapped from between the two first stage delay elements 60 and remains on time, and the $a_1$ element is tapped prior to the first delay element 60 of the first stage, and it also is correlated on time. The output of the dope delay element 56 is now also correlated on time because the dope delay element 56 is two delay units as depicted. The four values are summed at the first stage adder 62 and input into the PNCA accumulator 64. Each subsequent clock or chip will also exhibit four on-time values that are input into the PNCA accumulator 64 so a value is generated each clock or chip as noted.

FIG. 12 is a block diagram of a matched filter similar in concept to that of FIG. 11A, but for a composite code of length 161,105 made from four constituent codes (A, B, C, D) each of length 10, and doped on each level with one of four doping codes (AX, BX, CX, DX, respectively), including the first level. It is noted that the taps in FIG. 12 remove their respective element following the delay element with which they are associated in FIG. 12. Due to the length 10 constituent codes, each doping code has 55 elements labeled, for example, $Dx_1, Dx_2, Dx_3, \ldots Dx_{55}$. Doping is as previously described, an increasing number of unique dope code elements following each subsequent code segment (or code element in the case of the A code). A third 66 and fourth 68 circuit stage are disposed prior to the second circuit stage 42. Each stage includes 65 taps: 55 to remove the dope code, and 10 to remove the constituent code. Delay elements are as shown, varying from unit delays to 16,105 units. FIG. 12 exhibits two distinctions over FIG. 11A. Because the A code is doped in FIG. 12 but not in FIG. 11A, the first stage includes dope code taps 70, a dope code adder 72, and a dope delay element 74. This gives rise to the need for delay elements 58 in the first stage that are not unit delays, which drives the need for ten unit delays 76 in series disposed between the first stage adder 62 and a dope code adder 78 that itself feeds into the PNCA accumulator 64. A second difference is that each dope element adder 72, 54, 80 except the dope element adder 82 in the highest stage (fourth stage 68 in FIG. 12) sums the output of the next higher stage with the tapped dope code elements from its own stage.

The end result of FIG. 12 is a total of 280 taps (65 taps/stage×4 stages) as compared to 161,105 taps that would be necessary in a prior art parallel despreader, a hardware savings of 99.8% for relatively minor sacrifice in autocorrelation.

Various despreaders may be designed consistent with the above teachings depending upon how the composite code is constructed and where doped elements are disposed and to what extent. The essence is that each stage of the despreader removes one of the constituent codes, and the addition of delay elements reduces the number of taps required. The doping code for that level may be removed within the same stage as the constituent code, or may be removed in a separate stage disposed prior to or between stages that remove the constituent code. Energy from the doping code elements may be discarded, kept separate from the values derived from the code segments, or added back with them prior to input into the PNCA 64. The options are too numerous to illustrate because the doped composite code may be constructed form an infinite variety of constituent codes and doping codes. Nevertheless, all are variants of the teachings above.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

We claim:

1. A communications method for use in a spread spectrum communications system comprised of at least first and second spread spectrum communications channels, the communications method comprising:
  at a transmitting node:
    selecting acquisition information for use in acquiring a target signal to be transmitted in the second spread spectrum communications channel;
    creating an acquisition signal for use in acquiring the target signal to be transmitted in the second spread spectrum communications channel, where the acquisition signal comprises, at least in part, the acquisition information for use in acquiring the target signal;
    transmitting the acquisition signal in the first spread spectrum communications channel;
    spreading the target signal with a spreading code, where the acquisition information carried in the acquisition signal is used to acquire the target signal; and
    transmitting the target signal in the second spread spectrum communications channel;
  where the acquisition signal comprises a preamble portion spread with a first spreading code and a payload portion spread with a second spreading code.

2. The communications method of claim 1 where the acquisition information carried by the acquisition signal concerns the phase of the spreading code used to spread the target signal.

3. The communications method of claim 1 where the payload portion of the acquisition signal carries the acquisition information for acquiring the target signal, and where the acquisition information concerns the phase of the spreading code used to spread the target signal.

4. The communications method of claim 1 where the payload portion of the acquisition signal is encoded using an error-correcting code.

5. The communications method of claim 4 where the error-correcting code is a turbo code.

6. The communications method of claim 1 where the payload portion of the acquisition signal is encrypted.

7. The communications method of claim 1 where the payload portion of the acquisition signal is spread with QPSK.

8. The communications method of claim 1 further comprising:
  at a receiving node:
    receiving the acquisition signal;
    recovering the acquisition information for acquiring the target signal from the acquisition signal; and
    using the acquisition information recovered from acquisition signal to acquire the target signal.

9. The communications method of claim 8, where the acquisition information recovered from the acquisition signal comprises phase information concerning the phase of the spreading code used to spread the target signal.

10. The communications method of claim 1 further comprising the initial steps of:
  creating the first spreading code from at least two constituent spreading codes, where the first spreading code comprises a composite spreading code.

11. The communications method of claim 10, where creating the first spreading code further comprises:
  doping the first spreading code by adding code elements from at least a third constituent spreading code to the composite spreading code created from the at least two constituent codes, wherein the adding is done in such a way as to improve the autocorrelation properties of the composite spreading code.

12. The communications method of claim 1 where the second spreading code is relatively long in comparison to the first spreading code.

13. The communications method of claim 1, where the method is used in a synchronous communications channel, and where transmitting and receiving nodes have access to a common clock, the communications method further comprising:
  changing the first spreading code used to spread the preamble portion of the acquisition signal at time intervals in dependence on the time established by the common clock.

14. The communications method of claim 1, where the method is used in an asynchronous communications channel where the first spreading code comprises a single spreading code which is used to spread the preamble portion of the acquisition signal at all times.

15. The communications method of claim 1, where the method is used in an asynchronous communications channel, the method comprising:
  selecting a spreading code from a limited library of spreading codes for use in spreading the preamble portion of the acquisition signal; and
  using the selected spreading code as the first spreading code to spread the preamble portion of the acquisition signal.

16. The communications method of claim 1 where the preamble carries a pattern to allow a receiver to determine the phase of the first spreading code.

17. The communications method of claim 1 where the preamble portion carries a synchronization pattern for indicating where the preamble portion ends and the payload portion begins.

18. The communications method of claim 17 where the synchronization information is a Barker sequence.

19. The communications method of claim 1 further comprising:
  at the transmitting node and during transmission of the preamble portion of the acquisition signal, emitting a jamming signal, where the jamming signal is designed both to hinder eavesdroppers without knowledge of the structure of the acquisition signal from recovering the acquisition signal, and to preserve the ability of a receiving node to detect and to demodulate the acquisition signal.

20. The communications method of claim 19 where the first spreading code used to spread the preamble portion of the acquisition signal represents a processing gain of at least 50 dB.

21. The communications method of claim 19 where the first spreading code used to spread the preamble portion of the acquisition signal represents a processing gain of at least 40 dB.

22. The communications method of claim 1 where the preamble portion is comprised of a plurality of data symbols spread by the first spreading code, wherein the first spreading code repeats each data symbol.

23. The communications method of claim 1, where the method is used for node discovery as an initial step in establishing communications between two nodes which have previously not communicated with one another, where the transmitting node comprises a hailing node and a receiving node comprises a responding node, and where the acquisition signal comprises a discovery signal.

24. The communications method of claim 1 where the spread spectrum communications system is a frequency-hopped spread spectrum communications system and the acquisition information contained in the acquisitions signal concerns a frequency hopping pattern used when transmitting the target signal.

25. The communications method of claim 1 where the spread spectrum communications system is a hybrid time division-direct sequence spread spectrum communications system, and the acquisition information further comprises time slot information concerning time slots during which the target signal will be transmitted.

26. The communications method of claim 1 where the spread spectrum communications system is a hybrid frequency division-direct sequence spread spectrum communications system, and the acquisition information further comprises frequency band information concerning the frequency bands in which the target signal will be transmitted.

27. The communications method of claim 1 where the spread spectrum communications system is a direct sequence spread spectrum communications system and where the acquisition signal is continuously transmitted.

28. The communications method of claim 1 where the spread spectrum communications system is a direct sequence spread spectrum communications system and where the target signal is continuously transmitted.

29. The communications method of claim 1 where the spread spectrum communications system is a direct sequence spread spectrum communications system and where the acquisition signal is transmitted in bursts.

30. The communications method of claim 1 where the spread spectrum communications system is a direct sequence spread spectrum communications system and where the target signal is transmitted in bursts.

31. A communications method for use in a spread spectrum communications system comprised of at least first and second spread spectrum communications channels, the communications method comprising:
at a receiving node:
receiving an acquisition signal transmitted in the first spread spectrum communications channel, where the acquisition signal carries acquisition information for acquiring a target signal to be transmitted at some point in time after the acquisition signal in the second spread spectrum communications channel;
recovering the acquisition information for acquiring the target signal from the acquisition signal; and
using the information to acquire the target signal;
where the acquisition signal comprises a preamble portion and a payload portion,
and where the preamble portion is spread with a first spreading code and the payload portion is spread with a second spreading code,
and where the preamble portion carries a pattern indicating the phase of the first spreading code,
and where recovering acquisition information for acquiring the target signal further comprises the initial step of de-spreading the preamble portion of the acquisition signal using the first spreading code and phase information reflected in the pattern.

32. The communications method of claim 31 where the target signal is spread with a spreading code,
and where the acquisition information carried by and recovered from the acquisition signal concerns phase information concerning the spreading code used to spread the target signal.

33. The communications method of claim 31 where the preamble portion of the acquisition signal carries a synchronization pattern indicating where the preamble portion ends and the payload portion begins,
and where recovering acquisition information for acquiring the target signal further comprises the additional step of:
detecting the beginning of the payload portion using the synchronization pattern; and
de-spreading the payload portion of the acquisition signal using the second spreading code.

34. A node operable in a spread spectrum communications system for transmitting spread spectrum communication signals, the node comprising:
at least one antenna; and
a transmitter coupled to the at least one antenna,
where the transmitter transmits an acquisition signal in a first spread spectrum communications channel
and where the acquisition signal comprises at least in part acquisition information for use in acquiring a target signal to be transmitted in a second spread spectrum communications channel and the acquisition signal further comprises a preamble portion spread with a first spreading code and a payload portion spread with a second spreading code.

35. The node of claim of claim 34, where the target signal is spread with a spreading code,
and where the acquisition information carried in the acquisition signal concerns the phase of the spreading code used to spread the target signal.

36. The node of claim 34,
where the second spreading code is relatively long in comparison to the first spreading code.

37. The node of claim 36, where the first spreading code is a composite code constructed from at least two constituent codes.

38. The node of claim 37, where the composite code corresponding to the first spreading code is doped with at least a third constituent code,
where the doping of the composite code improves the autocorrelation properties of the composite code.

* * * * *